United States Patent

Yano et al.

[11] Patent Number: 5,836,287
[45] Date of Patent: Nov. 17, 1998

[54] SYSTEM AND METHOD FOR CONTROLLING AIR-FUEL RATIO IN INTERNAL COMBUSTION ENGINE

[75] Inventors: Toru Yano; Eisuke Kimura; Masanori Hayashi; Yusuke Tatara; Toshio Yokoyama; Kenichiro Kinoshita, all of Saitama, Japan

[73] Assignee: Honda Giken Kogyo Kabushiki Kaisha, Tokyo, Japan

[21] Appl. No.: 912,441

[22] Filed: Aug. 18, 1997

Related U.S. Application Data

[63] Continuation of Ser. No. 424,880, Apr. 10, 1995.

[30] Foreign Application Priority Data

| Apr. 8, 1994 | [JP] | Japan | 6-71128 |
| Apr. 13, 1994 | [JP] | Japan | 6-74768 |
| Apr. 26, 1994 | [JP] | Japan | 6-88341 |

[51] Int. Cl.$^6$ .................................................. F02D 43/00
[52] U.S. Cl. ........................................................ 123/478
[58] Field of Search ............................... 123/478, 480, 123/486, 492, 493

[56] References Cited

U.S. PATENT DOCUMENTS

| 3,842,811 | 10/1974 | Shinoda | 123/492 |
| 4,553,518 | 11/1985 | Takao et al. | 123/478 |
| 4,709,674 | 12/1987 | Bianchi et al. | 123/327 |
| 5,483,938 | 1/1996 | Oshima et al. | 123/478 |

FOREIGN PATENT DOCUMENTS 4-295151  10/1992  Japan.

*Primary Examiner*—Andrew M. Dolinar
*Attorney, Agent, or Firm*—Lyon & Lyon LLP

[57] ABSTRACT

A system for controlling fuel injection in an internal combustion engine such that when the target air-fuel ratio is switched from a rich value to a lean value, the air-fuel ratios are switched to the lean value by sequentially decreasing the amount of fuel injected into the cylinders, for example in a four cylinder engine into the #1, #2, #3 and #4 cylinders, with predetermined time differences. During this time, an electronic air control valve (EACV) is controlled in such a manner that it is stepwise opened with the switching of the air-fuel ratios for the #1, #2, #3 and #4 cylinders, thereby causing the engine torque to remain the same to prevent the generation of a torque shock. When the target air-fuel ratio has been switched from the lean level to the rich level, the amounts of fuel injected into the #1, #2, #3 and #4 cylinders are controlled in such a manner that they are sequentially increased with predetermined time differences, and the EACV is controlled in such a manner that it is stepwise closed. Thus, it is possible to avoid the generation of a torque shock, while preventing the degradation of the emission during switching of the air-fuel ratio.

4 Claims, 27 Drawing Sheets

FIG.22

Comparison of orders of switching when A/F ratios for two cylinders has been leaned

| | (A) | (B) | (C) |
|---|---|---|---|
| Order of switching | #1 → #3 → #4 → #2 | #2 → #3 → #1 → #4 | #1 → #2 → #3 → #4 |
| Order of discharge of exhaust gas | leaned cylinder #1, #3<br>13421342<br>LLSSLLSSLLSS | leaned cylinder #2, #3<br>13421342<br>SLSLSLSLSLSL | leaned cylinder #1, #2<br>13421342<br>LSSLLSSLLSSL |
| Flow of gas into CAT | | | |

FIG.24

Comparison of orders of switching when A/F ratios for two cylinders has been rendered stoicometrical

| | (D) | (E) | (F) |
|---|---|---|---|
| Order of switching | #1 → #3 → #4 → #2 | #2 → #3 → #1 → #4 | #1 → #2 → #3 → #4 |
| Order of discharge of exhaust gas | Stoichiometrical cylinder #1, #3<br>13421342<br>SSLLSLLSSLL | Stoichiometrical cylinder #2, #3<br>13421342<br>LSLSLSLSLS | Stoichiometrical cylinder #1, #2<br>13421342<br>SLLSSLLSSLLS |

SYSTEM AND METHOD FOR CONTROLLING AIR-FUEL RATIO IN INTERNAL COMBUSTION ENGINE

This is a Continuation application of Ser. No. 08/424,880, filed Apr 10, 1995.

BACKGROUND OF THE INVENTION

1. Field of the Invention

The present invention relates to a system and method for controlling the air-fuel ratio in an internal combustion engine, wherein the air-fuel ratios for cylinders are switched with predetermined time differences.

2. Description of the Prior Art

There is a conventionally known internal combustion engine described in Japanese Patent Application Laid-open No. 295151/1992, in which the air-fuel ratios for cylinders are switched with predetermined time differences.

If the target air-fuel ratio is continuously switched from a rich value (an A point) to a lean value (a B point), as shown in FIG. 27, it is disadvantageous in that the amount of $NO_x$ discharged is suddenly increased at a medium air-fuel ratio, as shown by a solid line. On the other hand, if the target air-fuel ratio is switched in a moment from the rich value (the A point) to the lean value (the B point), it is possible to avoid the sudden increase in amount of $NO_x$ discharged, as shown by a dashed line. However, if the target air-fuel ratio for each of the cylinders is switched in a moment, the engine torque is suddenly varied to generate a shock, thereby bringing about a problem of a degradation in driveability.

Therefore, in the above prior art internal combustion engine, in switching the target air-fuel ratio from the rich level to the lean level, the amounts of fuel injected by fuel injection valves provided at each of the cylinders are sequentially decreased at predetermined intervals beyond a medium air-fuel ratio at which an emission is degraded. This avoids a torque shock which may be otherwise produced when the amounts of fuel injected into all the cylinders are decreased simultaneously, thereby providing an improvement in driveability while preventing the degradation of the emission.

However, the prior art engine suffers from a problem that the prevention of the degradation of the emission and the avoidance of the generation of the torque shock are not reconciled depending upon the operational range of the engine because of the uniformly set time differences for sequentially decreasing the amounts of fuel injected by the fuel injection valves. In addition, there is a problem that only the control of the amounts of fuel injected by the fuel injection valves does not make it possible to completely prevent the torque shock, whereby the degradation of the driveability due to the generation of the torque shock cannot be sufficiently prevented.

When the above prior art internal combustion engine includes an EGR (Exhaust Gas Recirculating) gas circulating system, even if the circulation of an EGR gas is stopped in switching the target air-fuel ratio from the rich to the lean, the amount of the EGR gas in an intake system is not immediately reduced to zero, and the EGR gas remains in the intake system, until a predetermined time has lapsed. If the amount of fuel injected is decreased in this condition to change the air-fuel ratio to the lean side, the following problem is encountered; the combustion of the air-fuel mixture is degraded due to the presence of the EGR gas to bring about a combustion failure such as a misfire.

In the above prior art internal combustion engine, there is a further problem that even if the air-fuel ratio for each of the cylinders is changed to avoid the medium air-fuel ratio at which the amount of $NO_x$ discharged is increased, the exhaust gas from the cylinder with a rich air-fuel ratio is diluted by the exhaust gas from the cylinder with a lean air-fuel ratio, resulting in a reduced purifying efficiency of an exhaust emission control catalyst.

SUMMARY OF THE INVENTION

Accordingly, it is a first object of the present invention to effectively avoid the generation of a torque shock, while preventing the degradation of the emission upon the switching of the target air-fuel ratio.

It is a second object of the present invention to effectively avoid the combustion failure of an air-fuel mixture due to the EGR gas upon the switching of the target air-fuel ratio.

It is a third object of the present invention to possibly avoid the degradation of the emission, when both a cylinder with a rich air-fuel ratio and a cylinder with a lean air-fuel ratio exist.

To achieve the first object, according to the present invention, there is provided an air-fuel control system in an internal combustion engine, comprising a fuel injection valve provided at each of the cylinders, a target air-fuel ratio setting means for setting a target air-fuel ratio based on the operational state of the internal combustion engine, and a fuel injection amount control means for changing the amounts of fuel injected by the fuel injection valves based on the target air-fuel ratio, in which when the target air-fuel ratio setting means has switched the target air-fuel ratio, the fuel injection amount control means sequentially changes the amounts of fuel injected with predetermined time differences for each of the fuel injection valves, the fuel injection amount control means being capable of changing the time differences.

With the above arrangement, the fuel injection amount control means is capable of changing the time differences for sequentially changing the amounts of fuel injected by the fuel injection valves, when the target air-fuel ratio is switched. Therefore, it is possible to select optimal time differences in response to the switching from a rich level to a lean level or the switching from the lean level to the rich level to effectively reconcile the prevention of the degradation of the emission and the improvement in driveability.

To achieve the second object, according to the present invention, there is provided an air-fuel control system in an internal combustion engine, comprising a fuel injection valve provided at each of the cylinders, an EGR gas circulation amount control means for controlling the amount of EGR gas circulated from an exhaust passage to an intake passage, a target air-fuel ratio setting means for setting a target air-fuel ratio based on the operational state of the internal combustion engine, and a fuel injection amount control means for controlling the amounts of fuel injected by the fuel injection valves based on the target air-fuel ratio, in which when the target air-fuel ratio setting means has switched the target air-fuel ratio, the fuel injection amount control means sequentially decreases the amounts of fuel injected with predetermined time differences for each of the fuel injection valves, the air-fuel control system further including a residual EGR gas amount calculating means for calculating the amount of EGR gas remaining in the intake system, whereby when the target air-fuel ratio setting means has switched the target air-fuel ratio, the EGR gas circulation amount control means decreases the amount of EGR gas circulated, and the fuel injection amount control means starts the decreasing of the amount of fuel injected, after waiting for the decreasing of the residual EGR gas amount calculated by the residual EGR gas amount calculating means down to a predetermined value or less. With the above arrangement, the air-fuel control system includes the residual EGR gas amount calculating means for calculating the amount of EGR gas remaining in the intake system. When the target air-fuel ratio setting means has switched the target air-fuel ratio, the EGR gas circulation amount control means decreases the amount of EGR gas circulated, and the fuel injection amount control means starts the decreasing of the amount of fuel injected, after waiting for the decreasing of the residual EGR gas amount calculated by the residual EGR gas amount calculating means down to the predetermined value or less. Therefore, in a condition in which the residual EGR gas amount is large, the air-fuel ratio cannot be changed to the lean value, thereby preventing the generation of a combustion failure and/or a misfire.

In addition, to achieve the second object, according to the present invention, there is provided at air-fuel ratio control system in an internal combustion engine, comprising a fuel injection valve provided in each of the cylinders, an EGR gas circulation amount control means for controlling the amount of EGR gas circulated from an exhaust passage to an intake passage, a target air-fuel ratio setting means for setting a target air-fuel ratio based on the operational state of the internal combustion engine, and a fuel injection amount control means for controlling the amounts of fuel injected by the fuel injection valves based on the target air-fuel ratio, in which when the target air-fuel ratio setting means has switched the target air-fuel ratio, the fuel injection amount control means sequentially decreases the amounts of fuel injected with predetermined time differences for each of the fuel injection valves, the air-fuel ratio control system further including a residual EGR gas amount calculating means for calculating the amount of EGR gas remaining in the intake system, whereby when the target air-fuel ratio setting means has switched the target air-fuel ratio, the decreasing of the amount of EGR gas circulated by the EGR gas circulation amount control means and the decreasing of the amount of fuel injected by the fuel injection amount control means are started, so that the amount of fuel injected is decreased by the fuel injection amount control means in accordance with the decreasing of the residual EGR gas amount calculated by the residual EGR gas amount calculating means.

With the above arrangement, the air-fuel ratio control system includes a residual EGR gas amount calculating means for calculating the amount of EGR gas remaining in the intake system. When the target air-fuel ratio setting means has switched the target air-fuel ratio, the decreasing of the amount of EGR gas circulated by the EGR gas circulation amount control means and the decreasing of the amount of fuel injected by the fuel injection amount control means are started, so that the amount of fuel injected is decreased by the fuel injection amount control means in accordance with the decreasing of the residual EGR gas amount calculated by the residual EGR gas amount calculating means. Therefore, even if a situation having a medium air-fuel ratio is generated, the degradation of an emission is prevented by a residual EGR gas amount suitable for such situation. In addition, the air-fuel ratio is stepwise switched to the lean side simultaneously with the establishment of an air-fuel ratio switching condition, and therefore, the timing of the leaning the air-fuel ratio cannot be delayed to degrade the fuel consumption rate and moreover, while the air-fuel ratio remains stoichiometrical, the amount of EGR gas circulated cannot be decreased to degrade the emission.

To achieve the third object, according to the present invention, there is provided an air-fuel ratio controlling method in an internal combustion engine comprising an exhaust emission control catalyst provided in an exhaust passage common to all the cylinders, in which when the target air-fuel ratio is switched, the air-fuel ratios for the cylinders are sequentially switched by increasing or decreasing the amounts of fuel injected from fuel injection valves provided at each of the cylinders with predetermined time differences, wherein in a condition in which a plurality of cylinders with a rich air-fuel ratio exist, the order of discharge of the exhaust gas from the cylinders with the rich air-fuel ratio is continuous.

With the above feature, when the plurality of cylinders with the rich air-fuel ratio exist in sequentially switching the air-fuel ratio for the cylinders, the order of discharge of the exhaust gas from the cylinders with the rich air-fuel ratio is continuous. Therefore, it is possible to minimize the dilution of the exhaust gas from the cylinder with the rich air-fuel ratio by the exhaust gas from the cylinder with a lean air-fuel ratio, thereby preventing a reduction in performance of the exhaust emission control catalyst.

In addition, to achieve the above object, there is provided an air-fuel ratio controlling method in an internal combustion engine including an exhaust emission control catalyst provided in an exhaust passage common to the cylinders, in which when the target air-fuel ratio is switched, the air-fuel ratios for the cylinders are sequentially switched by increasing or decreasing the amounts of fuel injected from fuel injection valves provided at each of the cylinders with predetermined time differences, wherein in a condition in which a plurality of cylinders with a rich air-fuel ratio exist, the order of arrangement of the cylinders with the rich air-fuel ratio is determined, so that the cylinder with a lean air-fuel ratio is not interposed between said cylinders with said rich air-fuel ratio.

With the above feature, when the plurality of cylinders with a rich air-fuel ratio exist, the cylinders are arranged so that the cylinder with a lean air-fuel ratio is not interposed between such cylinders with the rich air-fuel ratio. Therefore, it is possible to minimize the dilution of the exhaust gas from the cylinder with the rich air-fuel ratio by the exhaust gas from the cylinder with a lean air-fuel ratio, thereby preventing a reduction in performance of the exhaust emission control catalyst.

Further, to achieve the third object, according to the present invention, there is provided an air-fuel ratio controlling method in an internal combustion engine comprising an exhaust emission control catalyst provided in each of a plurality of exhaust passages provided in correspondence to a plurality of groups of cylinders, in which when the target air-fuel ratio is switched, the air-fuel ratios for the cylinders are sequentially switched by increasing or decreasing the amounts of fuel injected from fuel injection valves provided at each of the cylinders with predetermined time differences, wherein the switching of the air-fuel ratios for the cylinders is sequentially carried out for each of the cylinder groups.

With the above feature, in sequentially switching the air-fuel ratios for the cylinders divided into the plurality of cylinder groups, the switching of the air-fuel ratio is carried out for each cylinder group. Therefore, the time, while the air-fuel ratios for all the cylinders in the cylinder group are rich, can be kept as long as possible, thereby preventing a reduction in performance of the exhaust emission control catalysts connected to the cylinder groups.

The above and other objects, features and advantages of the invention will become apparent from the following description of the preferred embodiments taken in conjunction with the accompanying drawings.

BRIEF DESCRIPTION OF THE DRAWINGS

FIGS. 1 to 5 illustrate a first embodiment of the present invention, wherein

FIG. 1 is a diagrammatic illustration of the entire arrangement of an air-fuel ratio control system in an internal combustion engine;

FIG. 2 is a block diagram illustrating a circuit arrangement of an electronic control unit;

FIG. 3 is a flow chart for explaining the operation of the first embodiment;

FIG. 4 is a timing chart of the conditions when the air-fuel ratio is switched from a rich level to a lean level;

FIG. 5 is a timing chart of the conditions when the air-fuel ratio is switched from the lean level to the rich level;

FIGS. 6 to 8 illustrate a second embodiment of the present invention, wherein

FIG. 6 is a flow chart for a status control routine;

FIG. 7 is a flow chart for an EACV driving routine;

FIG. 8 is a timing chart;

FIGS. 11 to 15 illustrate a fifth embodiment of the present invention, wherein:

FIG. 11 is a diagrammatic illustration of the entire arrangement of an air-fuel ratio control system in an internal combustion engine;

FIG. 12 is a block diagram illustrating a circuit arrangement of an electronic control unit;

FIG. 13 is a flow chart for explaining the operation of the fifth embodiment;

FIG. 14 is a flow chart for a subroutine of step S3 in the flow chart shown in FIG. 13;

FIG. 15 is a timing chart of the fifth embodiment;

FIGS. 16 to 18 illustrate a sixth embodiment of the present invention, wherein

FIG. 16 is a flow chart for explaining the operation of the sixth embodiment;

FIG. 17 is a table for searching a medium target air-fuel ratio from a net EGR factor;

FIG. 18 is a timing chart of the sixth embodiment;

FIGS. 19 to 24 illustrate a seventh embodiment of the present invention, wherein FIG. 19 is a diagrammatic illustration of the entire arrangement of an air-fuel ratio control system in an internal combustion engine;

FIG. 20 is a flow chart for explaining the operation in switching the air-fuel ratio from a rich level to a lean level;

FIG. 22 is a diagram for explaining the operation corresponding to FIGS. 21A, 21B and 21C;

FIG. 24 is a diagram for explaining the operation corresponding to FIGS. 23A, 23B and 23C;

FIGS. 25 and 26 illustrate an eighth embodiment of the present invention, wherein FIG. 25 is a diagrammatic illustration of the entire arrangement of an air-fuel ratio control system in an internal combustion engine;

FIG. 26 is a flow chart for explaining the operation in switching the air-fuel ratio from a rich level to a lean level.

DESCRIPTION OF THE PREFERRED EMBODIMENTS

A first embodiment of the present invention will now be described in connection with FIGS. 1 to 5.

Figure 1:
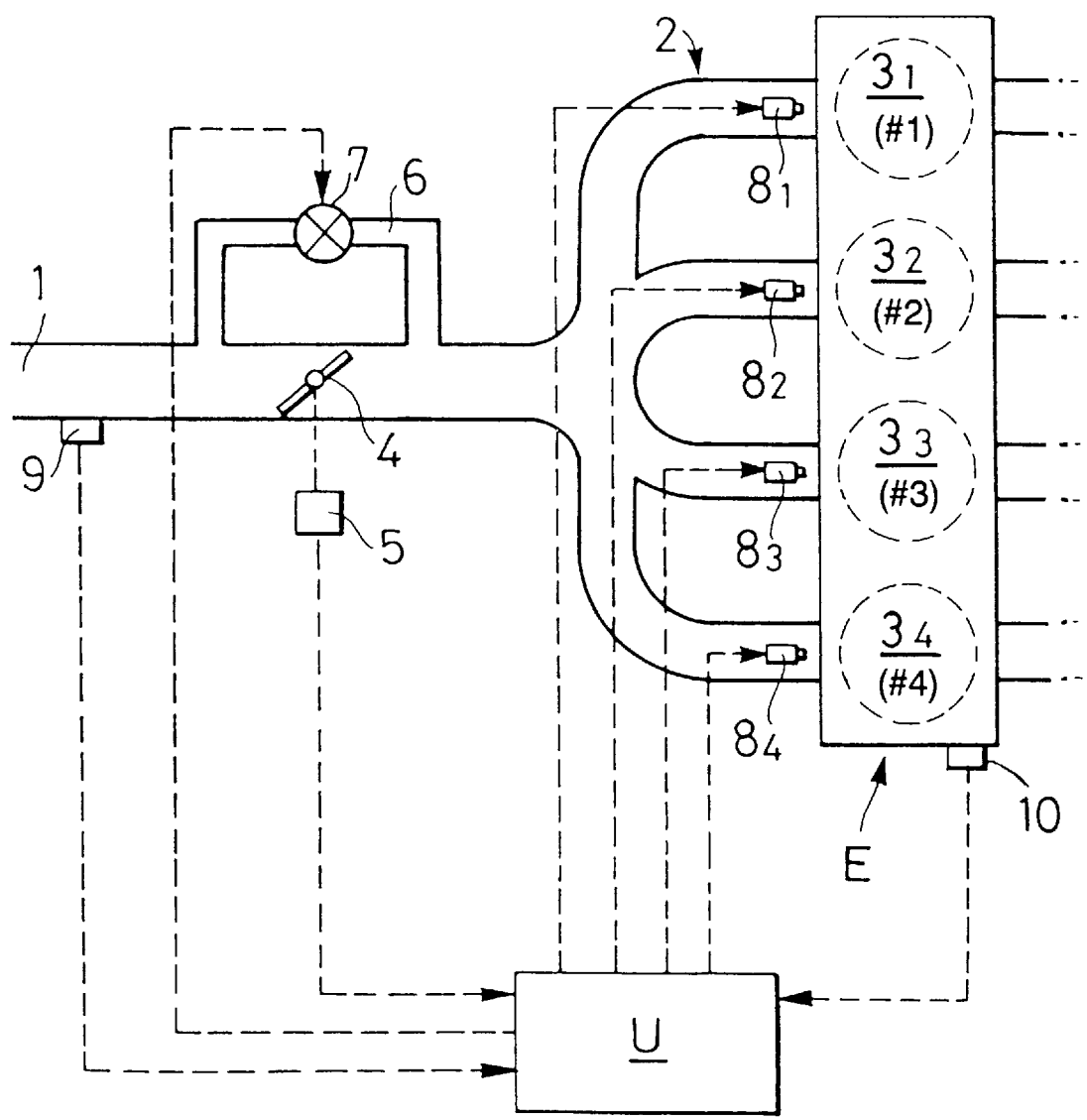

Referring to FIG. 1, an intake passage 1 in a 4-cylinder internal combustion engine E (which will be simply referred to as an engine E hereinafter) is connected to #1, #2, #3 and #4 cylinders $3_1$, $3_2$, $3_3$ and $3_4$ through an intake manifold 2. A throttle valve 4 is provided in the intake passage 1 and connected to and opened and closed by an accelerator pedal which is not shown. A signal from a throttle opening degree sensor 5 connected to the throttle valve 4 for detecting a throttle opening degree θTH is supplied to an electronic control unit U. An electronic air control valve 7 (which will be simply referred to as EACV 7 hereinafter) is provided in a bypass passage 6 which is connected to the intake passage 1 to bypass the throttle valve 4. The EACV 7 is connected to and controlled by the electronic control unit U.

Four fuel injection valves $8_1$, $8_2$, $8_3$ and $8_4$ are mounted in the intake manifold 2 in correspondence to the four cylinders $3_1$, $3_2$, $3_3$ and $3_4$. The fuel injection valves $8_1$, $8_2$, $8_3$ and $8_4$ are connected to and controlled by the electronic control unit U.

An intake air amount sensor 9 comprising an air flow meter for detecting an intake air amount Q is provided on the intake passage 1 at a location upstream of the throttle valve 4. A signal from the intake air amount sensor 9 is supplied to the electronic control unit U. An engine revolution-number sensor 10 is provided in the engine E for detecting the number Ne of revolutions of the engine based on the rotation of the crankshaft, which is not shown, and a signal from the engine revolution-number sensor 10 is supplied to the electronic control unit U. The engine revolution-number sensor 10 also simultaneously delivers a crankshaft angle signal and a cylinder judgment signal in addition to a signal indicative of the number Ne of revolutions of the engine.

Figure 2:
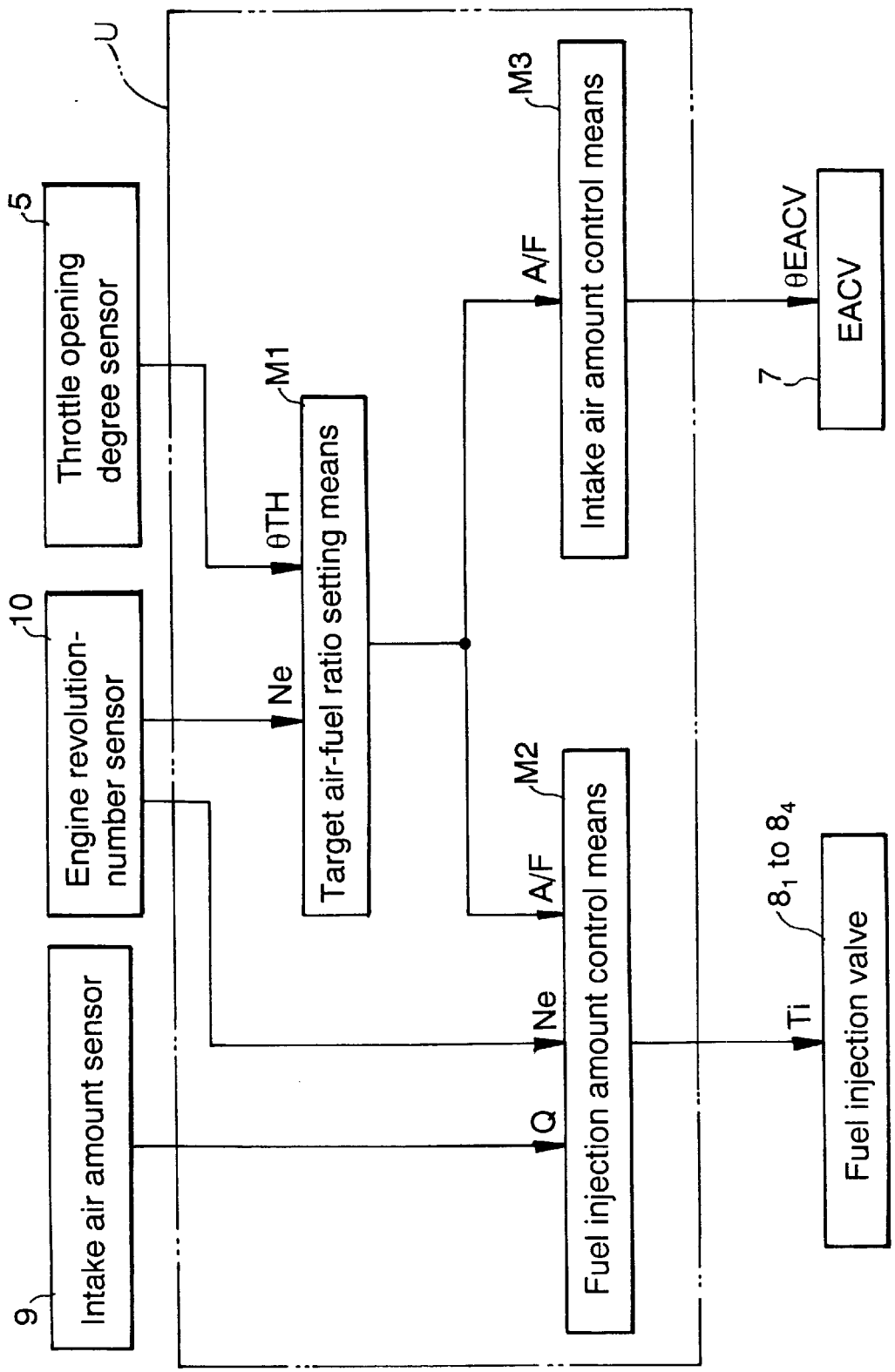

Referring to FIG. 2, the electronic control unit U includes a target air-fuel ratio setting means M1 for switching a target air-fuel ratio based on the operational state of the engine E, a fuel injection amount control means M2 for controlling the amount of fuel injected by the fuel injection valves $8_1$, $8_2$, $8_3$ and $8_4$ based on the target air-fuel ratio, and an intake air amount control means M3 for controlling the opening degree of the EACV 7 based on the target air-fuel ratio.

The throttle opening degree θTH detected by the throttle opening degree sensor 5 and the engine revolution-number Ne detected by the engine revolution-number sensor 10 are supplied to the target air-fuel ratio setting means M1, and a target air-fuel ratio A/F is map-searched based on the throttle opening degree θTH and the engine revolution-number Ne. In a usual operation range of the engine E, the target air-fuel ratio A/F is set at a stoichiometry (rich), i.e., at 14.7 which is a theoretical value (A/F=14.7). On the other hand, in a particular operational range such as during speed-reduction of the engine, the target air-fuel ratio A/F is substantially leaned and set at any of 20 or 23 in order to provide an improvement in specific fuel consumption.

When the target air-fuel ratio is of the theoretical value, the fuel injection amount control means M2 sets a fuel injection amount Ti corresponding to the air intake amount Q detected by the intake air amount sensor 9 and the engine revolution-number Ne detected by the engine revolution-number sensor 10 to provide the theoretical value. On the other hand, when the target air-fuel ratio is leaned into a value leaner than the theoretical value, the fuel injection amount control means M2 sets the fuel injection amount Ti to provide the lean target air-fuel ratio. When the target air-fuel ratio is switched, the fuel injection amount control means M2 controls the timing for changing the fuel injection amount Ti with a predetermined time difference (which will be described hereinafter) for every cylinder $3_1$, $3_2$, $3_3$, $3_4$. When the target air-fuel ratio is switched from the lean to the stoichiometry, the fuel injection amount control means M2 changes the time difference in accordance with a variation rate ΔθTH in throttle opening degree θTH. The function of the fuel injection amount control means M2 will be described hereinafter with reference to a flow chart.

The intake air amount control means M3 controls the opening degree θEACV of the EACV 7 in accordance with the increase or decrease in the fuel injection amount Ti when the target air-fuel ratio is switched. The function of the intake air amount control means M3 will be described hereinafter with reference to the flow chart.

The operation of the first embodiment of the present invention will be described below with reference to the flow chart shown in FIG. 3.

First, if a condition for switching the target air-fuel ratio is newly established based on the operational state of the engine E at step S1, an answer at step S2 becomes NO, proceeding to step S3. If the last target air-fuel ratio instructed by the target air-fuel ratio setting means M1 is stoichiometrical at step S3, the target air-fuel ratio has been changed from the stoichiometry (A/F=14.7) to the lean (A/F=20) by the current switching, and first switchover intervals given in Table 1 are selected at step S4.

TABLE 1

| For switching from stoichiometry to lean | | | |
|---|---|---|---|
| Cylinder | #1 → #3 | #3 → #4 | #4 → #2 |
| Interval | 24TDC | 12TDC | 12TDC |

When the first switchover intervals have been selected at step S4, the EACV 7 is driven in an opening direction in step S5, so that the intake air amount is increased, and the amount Ti of fuel injected from the fuel injection valve $8_1$, $8_2$, $8_3$ or $8_4$ corresponding to the current cylinder (i.e., the #1 cylinder $3_1$) is decreased in step S6, and with this decrease, both an ignition timing θ IG and a fuel injection timing θINJ for the #1 cylinder $3_1$ are changed.

In a next loop, the answers at steps S1 and S2 are changed into YES, proceeding to step S7. At each time the predetermined interval shown in Table 1 has elapsed at step S7, an increase in intake air amount and a decrease in the fuel injection amount at steps S5 and S6 are carried out. This control is carried out for the four cylinders $3_1$, $3_2$, $3_3$ and $3_4$ in the order of #1 cylinder $3_1$→#3 cylinder $3_3$→#3 cylinder $3_4$→#2 cylinder $3_2$.

Figure 4:
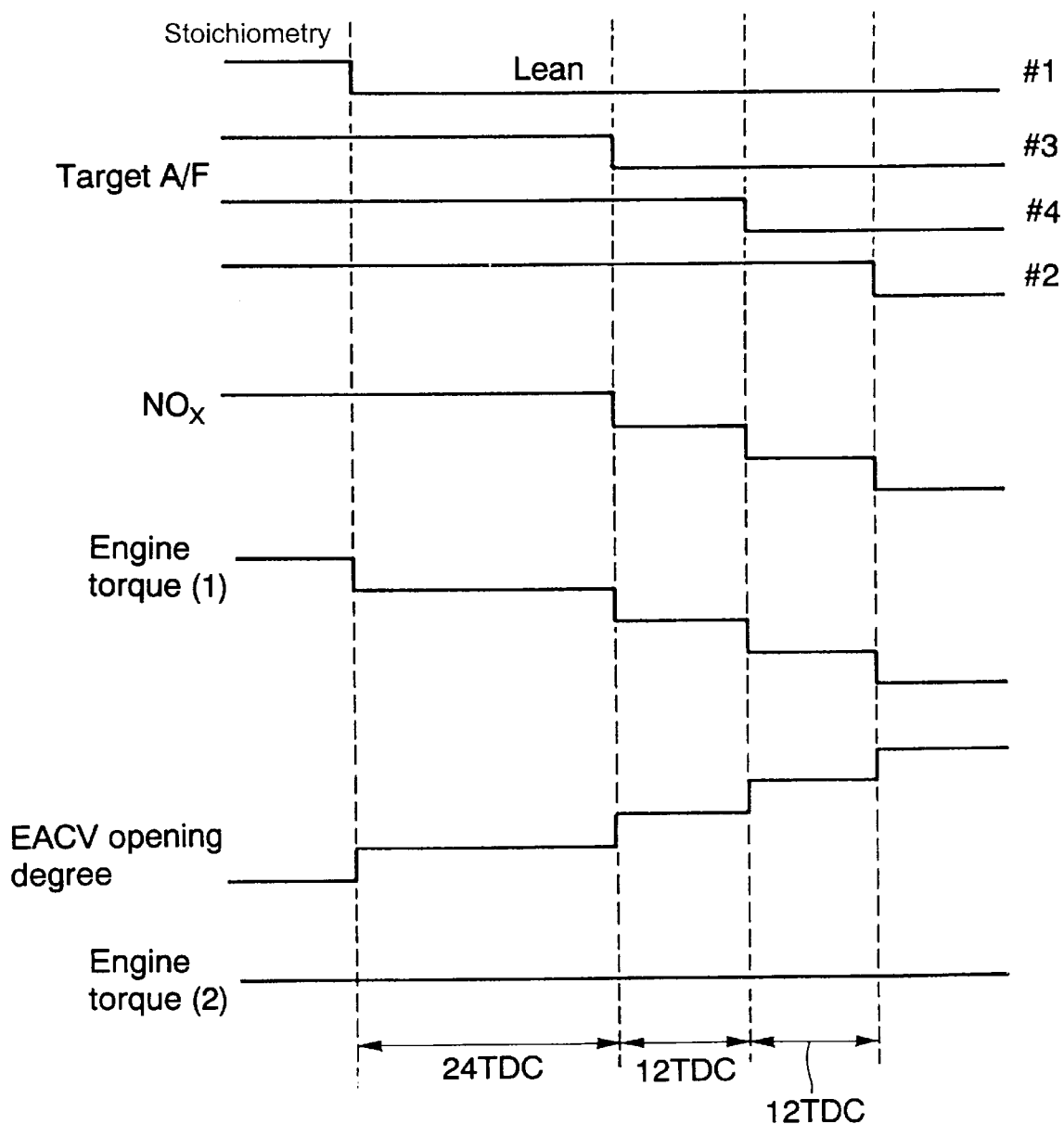

As can be seen from FIG. 4, the decreasing control for the fuel injection amount at step S6 is carried out, first of all, for the #1 cylinder $3_1$, and the air-fuel ratio for the #1 cylinder $3_1$ is changed from the stoichiometry to the lean (A/F=20). Then, after a lapse of 24 TDC (24 Top Dead Center positions of the crankshaft for #1 cylinder $3_1$) based on the interval shown in Table 1, the air-fuel ratio for the #3 cylinder $3_3$ is changed and then, after a lapse of 12 TDC, the air-fuel ratio for the #4 cylinder $3_4$ is changed. Finally, after a lapse of 12 TDC, the air-fuel ratio for the #2 cylinder $3_2$ is changed. TDC is a top dead center, and the interval is controlled by the number of TDCs detected.

The degradation of an emission can be prevented by changing the target air-fuel ratio from the stoichiometry to the lean beyond a medium air-fuel ratio (A/F=15 to 19) at which the emission is extremely degraded, as described above. Moreover, in this case, the amounts of fuel injected into the four cylinders $3_1$, $3_2$, $3_3$ and $3_4$ are sequentially changed at the predetermined intervals and hence, it is possible to prevent the engine torque from being suddenly varied and to avoid the degradation of driveability.

However, if only the control of the amount of fuel injected is carried out, the target air-fuel ratios for the cylinders $3_1$, $3_2$, $3_3$ and $3_4$ are sequentially leaned and for this reason, the stepwise decreasing of the torque cannot be completely avoided (see "Engine torque (1)" in FIG. 4). Therefore, a decrease in engine torque can be avoided to further effectively prevent the generation of a torque shock by using an intake air amount increasing control carried out at step S5 in combination with the control of the amount of fuel injected.

More specifically, when the target air-fuel ratio is changed from the stoichiometry to the lean, the opening degree of the EACV 7 is stepwise increased in parallel with the fuel injection amount decreasing control, thereby increasing the intake air amount to prevent the engine torque from being decreased. As a result, even if the amounts of fuel injected into each of the cylinders $3_1$, $3_2$, $3_3$ and $3_4$ are sequentially decreased, the engine torque is kept flat on the whole, and the prevention of the degradation of the emission and the prevention of the generation of a torque shock can be effectively reconciled (see "Engine torque (2)" in FIG. 4). It should be noted that the control for decreasing the amount of fuel injected and the control for increasing the intake air amount are conducted in association with each other, so that the target air-fuel ratio (A/F=20) is finally achieved.

It is desirable that the above-described control for increasing the intake air amount is conducted promptly in order to possibly avoid the decrease in engine torque to prevent the generation of a torque shock, but it must be avoided that such control is conducted too promptly, thereby suddenly increasing the engine torque. Therefore, when the amount of fuel injected into the #1 cylinder $3_1$ is initially decreased after establishment of the condition for switching the target air-fuel ratio (from the stoichiometry to the lean), the control for increasing the intake air amount is conducted at a timing of closure of the intake valve for the cylinder which is in an intake stroke immediately before such decrease. Likewise, when the amount of fuel injected into each of the #3, #4 and #2 cylinders $3_3$, $3_4$ and $3_2$ is decreased, the control for increasing the intake air amount is conducted at a timing of closure of the intake valve for the cylinder which is in an intake stroke immediately before such decrease. Thus, the output torque from the cylinder which is in the intake stroke (i.e., the cylinder which is still in a stoichiometrical condition) is prevented from being increased.

Figure 3:
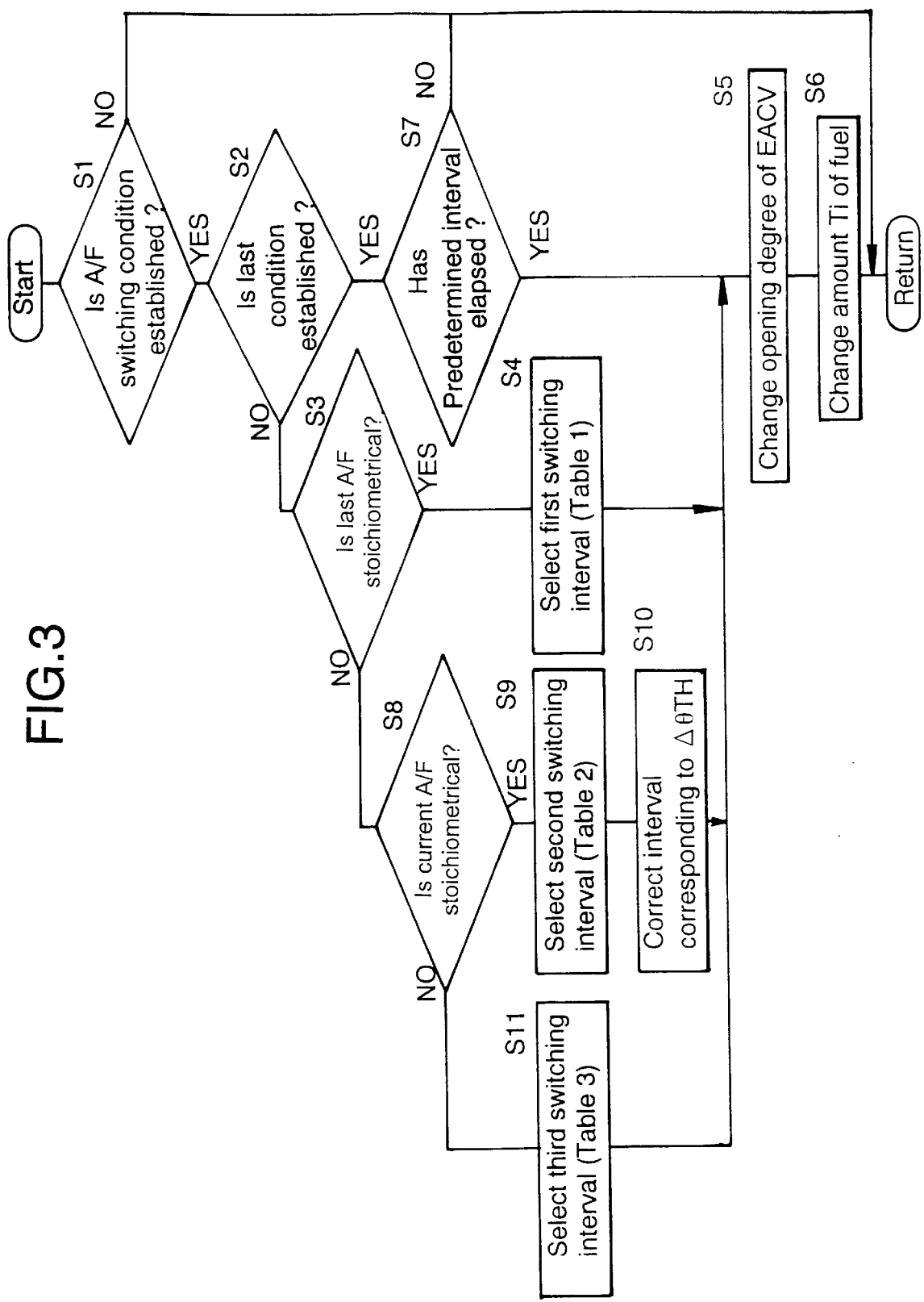

Returning to the flow chart in FIG. 3, if the answer at step S3 is NO and the answer at step S8 is YES, i.e., if the target air-fuel ratio has been switched from the lean to the stoichiometry, second switchover intervals shown in Table 2 are selected at step S9.

TABLE 2

For switching from lean to stoichiometry

| Cylinder Interval | #1 → #3 8TDC | #3 → #4 6TDC | #4 → #2 2TDC |
|---|---|---|---|

The intervals in Table 2 are used to control the amount of fuel injected, so that the amount of fuel injected into the #3 cylinder $3_3$ is increased with a lag of 8 TDC after increasing the amount of fuel injected into the #1 cylinder $3_1$, and then, the amount of fuel injected into the #4 cylinder $3_4$ is increased with a lag of 6 TDC and thereafter, the amount of fuel injected into the #2 cylinder $3_2$ is increased with a lag of 2 TDC. Such intervals are corrected at step S10 in accordance with the throttle opening degree θTH detected by the throttle opening degree sensor 5 and the variation rate ΔθTH.

Thus, if the interval (the TDC number) before being corrected in Table 2 is represented by N, and the interval (the TDC number) after correction is represented by N', a value of N' is determined according to a following expression:

$$N' = N \times (\text{reference } \Delta\theta TH)/(\text{Current } \Delta\theta TH)$$

At this time, the calculated value of N' is determined as an integer by raising a decimal fraction. Therefore, when the accelerator pedal has been depressed quickly, the interval (TDC number) N' after correction is smaller than the interval (TDC number) N before correction. Conversely, when the accelerator pedal has been depressed slowly, the interval (TDC number) N' after correction is larger than the interval (TDC number) N before correction.

Figure 5:
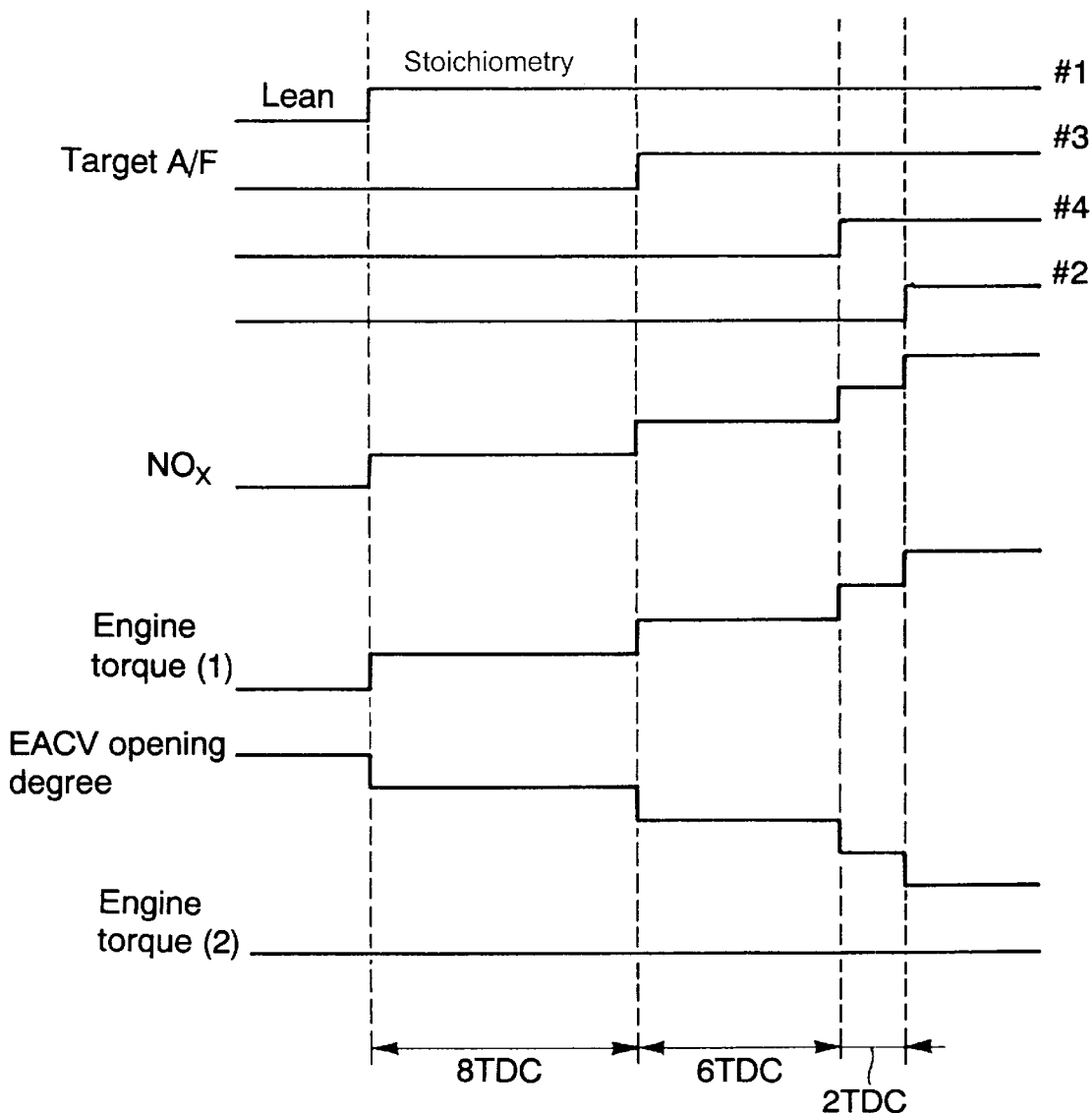

The control for stepwise decreasing the intake air amount and the control for stepwise increasing the amount of fuel injected are carried out at steps S5 and S6 of FIG. 3 in the manner shown in FIG. 5, thereby making it possible to switch the target air-fuel ratio from the lean to the stoichiometry, while preventing the degradation of the emission and the generation of a torque shock.

In general, the target air-fuel ratio is switched from the lean to the stoichiometry upon high loading or upon depression of the accelerator pedal, leading to a situation in which an accelerating feeling and a power feeling are expected. In this case, the torque shock generated with the switching of the target air-fuel ratio is highly acceptable, as compared with a case where the target air-fuel ratio is switched from the stoichiometry to the lean.

As is apparent from the comparison of Table 1 for the switching of the target air-fuel ratio from the stoichiometry to the lean with Table 2 for the switching of the target air-fuel ratio from the lean to the stoichiometry, each of the intervals in Table 2 with the high acceptability of the torque shock is smaller than that in Table 1. Moreover, when the amount of depression of the accelerator pedal is large, the interval in Table 2 is corrected to a further decreased value (see step S10), thereby making it possible to provide a predetermined torque shock to satisfy the accelerating feeling and the power feeling.

Further, the timing of the control for stepwise decreasing the intake air amount by the EACV 7 is carried out simultaneously with the timing of the control for decreasing the amount of fuel injected into each of the cylinders $3_1$, $3_2$, $3_3$ and $3_4$. If the target air-fuel ratio is compared with that switched from the stoichiometry to the lean, the timing of changing the intake air amount is slightly delayed. However, when the target air-fuel ratio is switched from the lean to the stoichiometry, as described above, a certain degree of a torque shock is acceptable and hence, even if the control for decreasing the intake air amount is slightly delayed and somewhat of a torque shock is generated, there is no hindrance.

If the answer at step S3 is NO and the answer at step S8 is NO, i.e., if the target air-fuel ratio has been switched between the lean (A/F=20) and the more lean (A/F=23), third switchover intervals given in Table 3 are selected at step S1. The intervals in Table 3 between the #1 to #4 cylinders are set equally at 2 TDC, and the stepwise control of the intake air amount and the stepwise control of the amounts of fuel injected are carried out based on such interval at steps S5 and S6.

TABLE 3

For switching from lean to more lean

| Cylinder Interval | #1 → #3 2TDC | #3 → #4 2TDC | #4 → #2 2TDC |
|---|---|---|---|

When the target air-fuel ratio is switched between the lean and the more lean in this manner, little torque shock is generated and for this reason, even if the interval is set at the shorter value of 2 TDC, there is not a problem that the driveability is degraded.

A second embodiment of the present invention will now be described in connection with FIGS. 6 to 8.

In this embodiment, four types of status, i.e., ST-AFCHG=0, 1, 2, 4 are established in accordance with the operational state of the engine E, and the amount of fuel injected by each of the fuel injection valves $8_1$, $8_2$, $8_3$ and $8_4$ and the opening degree of the EACV 7 are controlled based on the status ST-AFCHG.

Figure 6:
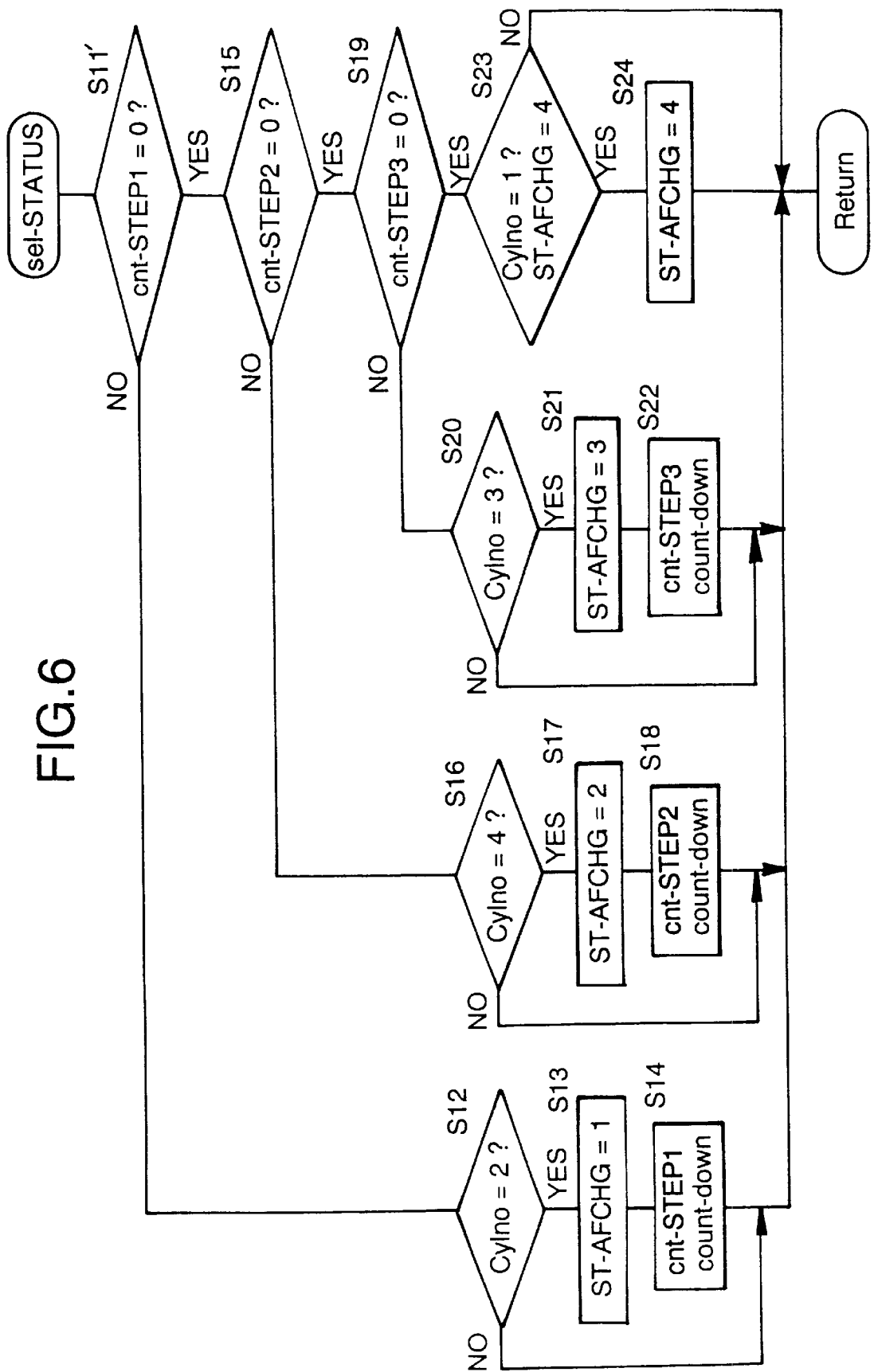

A status control routine shown in FIG. 6 is carried out at every TDC and corresponds to the switching from the stoichiometry to the lean. In this embodiment, the switching of the air-fuel ratio is carried out in the order of #2 cylinder $3_2 \rightarrow$ #4 cylinder $3_4 \rightarrow$ #3 cylinder $3_3 \rightarrow$ #1 cylinder $3_1$.

Before establishment of an air-fuel ratio switching condition, the status ST-AFCHG is set at "0", and all of first, second and third interval counters cnt-STEP1, cnt-STEP2 and cnt-STEP3 are set at "1".

When the air-fuel ratio switching condition has been established, the first interval counter cnt-STEP1 is equal to an initial value of 1 at step S11' and hence, the processing is advanced to step S12. It is judged at step S12 whether or not the cylinder number Cylno (i.e., the number of the cylinder $3_1$, $3_2$, $3_3$ or $3_4$ which is in a compression stroke) is "2". If the cylinder number becomes "2", the status ST-AFCHG is switched from "0" to "1" at step S13, and the first interval counter cnt-STEP1 effects a count-down at step S14. Thus, the first interval counter cnt-STEP1 which has been at the initial value of "1" is switched from "1" to "0" to complete the counting.

When the status ST-AFCHG has become "1" in the above manner, the first interval counter cnt-STEP1 has become "0" at step S11' and hence, the processing is advanced to step S15. At first, the second interval counter cnt-STEP2 is equal to the initial value of "1" at step S15 and hence, the processing is advanced to step S16. It is judged at step S16 whether or not the cylinder number Cylno is "4". When the cylinder number Cylno becomes "4", the status ST-AFCHG is switched from "1" to "2" at step S17, and the second interval counter cnt-STEP2 effects a count-down at step S18.

Thus, the second interval counter cnt-STEP2 which has been equal to the initial value of "1" is switched from "1" to "0" to complete counting.

When the status ST-AFCHG has been switched to "2" at step S17 in the above manner, both the first interval counter cnt-STEP1 and the second interval counter cnt-STEP2 have become equal to "0" at step S15 and hence, the processing is advanced to step S19. At first, the third interval counter cnt-STEP3 is equal to the initial value of "1" at step S19 and hence, the processing is advanced to step S20. It is judged at step S20 whether or not the cylinder number Cylno is "3". When the cylinder number Cylno becomes "3", the status ST-AFCHG is switched from "2" to "3" at step S21, and the third interval counter cnt-STEP3 effects a count-down at step S22. Thus, the third interval counter cnt-STEP3 which has been equal to the initial value of "1" is switched from "1" to "0" to complete the counting.

When the status ST-AFCHG has become "3" at step S21 in the above manner, the first, second and third interval counters cnt-STEP1, cnt-STEP2 and cnt-STEP3 all have become "0" at steps S11, S15 and S19 and hence, the processing is advanced to step S23. When the cylinder number Cylno becomes "1" at step S23, the status ST-AFCHG is switched from "3" to "4" at step S24.

Figure 8:
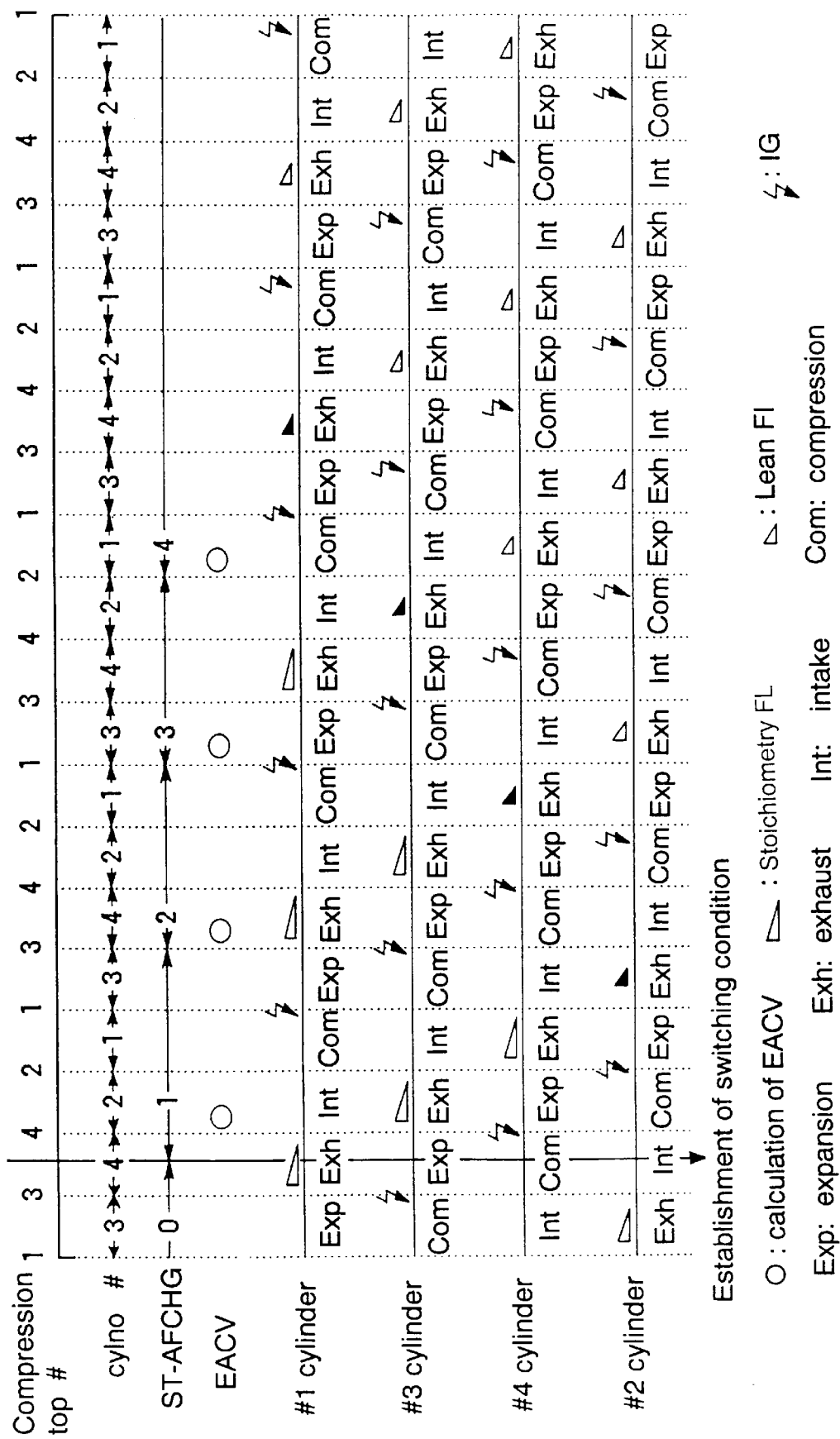

As is apparent from a timing chart in FIG. 8, when the status ST-AFCHG is "0", the air-fuel ratio for each of the cylinders $3_1$, $3_2$, $3_3$ and $3_4$ is set at the stoichiometry. When the status ST-AFCHG is "1", the air-fuel ratio for the #2 cylinder $3_2$ is changed to the lean. When the status ST-AFCHG is "2", the air-fuel ratio for each of the #2 and #4 cylinders $3_2$ and $3_4$ is changed to the lean. When the status ST-AFCHG is "3", the air-fuel ratio for each of the #2, #4 and #3 cylinders $3_2$, $3_4$ and $3_3$ is changed to the lean. When the status ST-AFCHG is "3", the air-fuel ratio for all the cylinders $3_1$, $3_2$, $3_3$ and $3_4$ is changed to the lean. In FIG. 8, a long triangle corresponds to a stoichiometrical condition in which the time of injection of the fuel is long, and a short triangle corresponds to a lean condition in which the time of injection of the fuel is short.

As the air-fuel ratio switching condition is established and the status ST-AFCHG is varied from "0" to "4", the air-fuel ratios for the four cylinders $3_1$, $3_2$, $3_3$ and $3_4$ are sequentially switched from the stoichiometry to the lean. At this time, all the initial values of the first, second and third interval counters cnt-STEP1, cnt-STEP2 and cnt-STEP3 are set at "1", but by changing the initial values, the air-fuel ratio switching intervals for the cylinders $3_1$, $3_2$, $3_3$ and $3_4$ can be set at any value. For example, if the initial value is changed from "1" to "2", the status ST-AFCHG is not varied, until the count-down is conducted two times, and hence, such intervals are increased.

When the target air-fuel ratio is switched from the lean to the stoichiometry, it is switched in the order of "5" (the ratio for the #2 cylinder $3_2$ is stoichiometry)→"6" (the ratios for the #2 and #4 cylinders $3_2$ and $3_4$ are stoichiometry)→"7" (the ratios for the #2, #4 and #3 cylinders $3_2$, $3_4$ and $3_3$ are stoichiometry), while the status ST-AFCHG is switched from "4" corresponding to the lean to "0" corresponding to the stoichiometry.

The control of the amount of fuel injected is carried out based on the status ST-AFCHG in this manner and at the same time, the opening degree of the EACV 7 is also controlled in order to further reduce the torque shock, as in the first embodiment.

Figure 7:
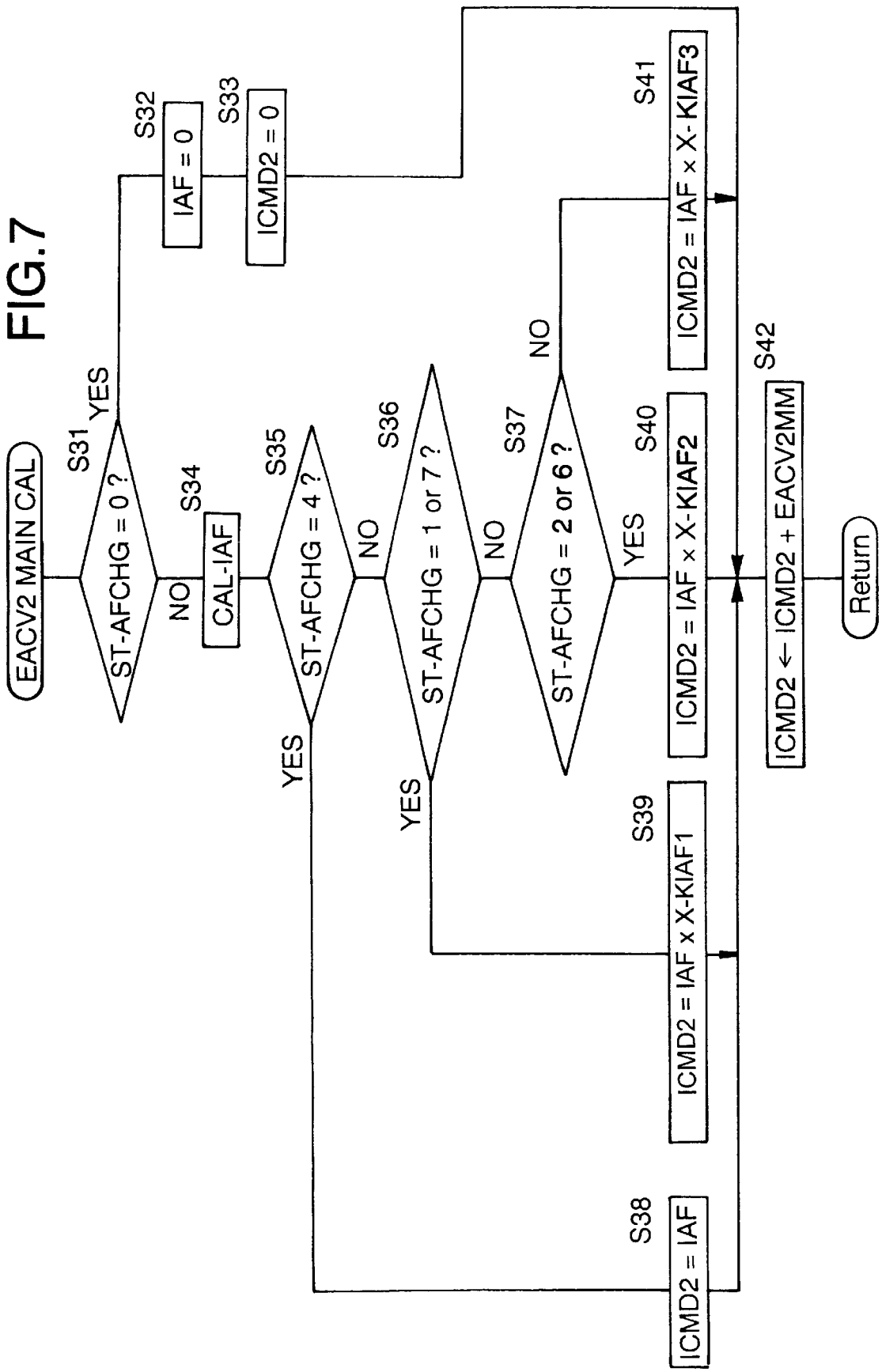

More specifically, if the status ST-AFCHG is "0" (the stoichiometry) at step S31 in a flow chart in FIG. 7, a basic drive amount IAF for the EACV 7 corresponding to the target air-fuel ratio is set at 0 at step S32 and a drive amount ICMD2 for the EACV 7 is thereby set at 0 at step S33.

If the status ST-AFCHG is not "0" (the stoichiometry) at step S31, the basic drive amount IAF for the EACV 7 is calculated, for example, by map-searching at step S34. If the status ST-AFCHG is "4" at step S35, the drive amount ICMD2 is set at the IAF at step S38 (ICMD2=IAF). If the status ST-AFCHG is "1" or "7" at step S36, the drive amount ICMD2 is set at IAF×X-KIAF1 at step S39. If the status ST-AFCHG is "2" or "6" at step S37, the drive amount ICMD2 is set at IAF×X-KIAF2 at step S40 (ICMD2=IAF X-KIAF2). If the status ST-AFCHG is "3" or "5", the drive amount ICMD2 is set at IAF×X-KIAF3 at step S41 (ICMD2=IAF×X-KIAF3). Here, each of KIAF1, KIAF2 and KIAF3 is a factor depending upon the status ST-AFCHG. Thus, the opening degree of the EACV 7 is changed based on a final drive amount ICMD2 determined at step S38, S39, S40 or S41.

The timing of driving the EACV 7 which corresponds to the calculation (see mark ○) of the opening degree of the EACV 7 carried out at the time of switching of the status ST-AFCHG in FIG. 8 is the same as in the first embodiment.

More specifically, when the air-fuel ratio has been switched from the rich (stoichiometry) to the lean, at each time the control for decreasing the amount of fuel injected is carried out at a short triangle location, the control for increasing the intake air amount is carried out at a timing of closure of the intake valve for the cylinder which is in the intake stroke immediately before such decreasing control. For example, when the control for decreasing the amount of fuel injected into the #2 cylinder $3_2$ is first carried out, the control for increasing the intake air amount is carried out at a timing of closure of the intake valve of the #4 cylinder $3_4$ which is in the intake stroke immediately before such decreasing control. When the control for decreasing the amount of fuel injected into each of the #4, #3 and #1 cylinders $3_4$, $3_3$ and $3_1$ is carried out, the control for increasing the intake air amount is carried out at a timing of closure of the intake valves for the #3, #1 and #2 cylinders $3_3$, $3_1$ and $3_2$ which are in the intake stroke immediately before such decreasing control. On the other hand, when the air-fuel ratio has been switched from the lean to the rich (stoichiometry), at each time the control for increasing the amount of fuel injected is carried out, the control for decreasing the intake air amount is carried out at the same timing.

Figure 9:
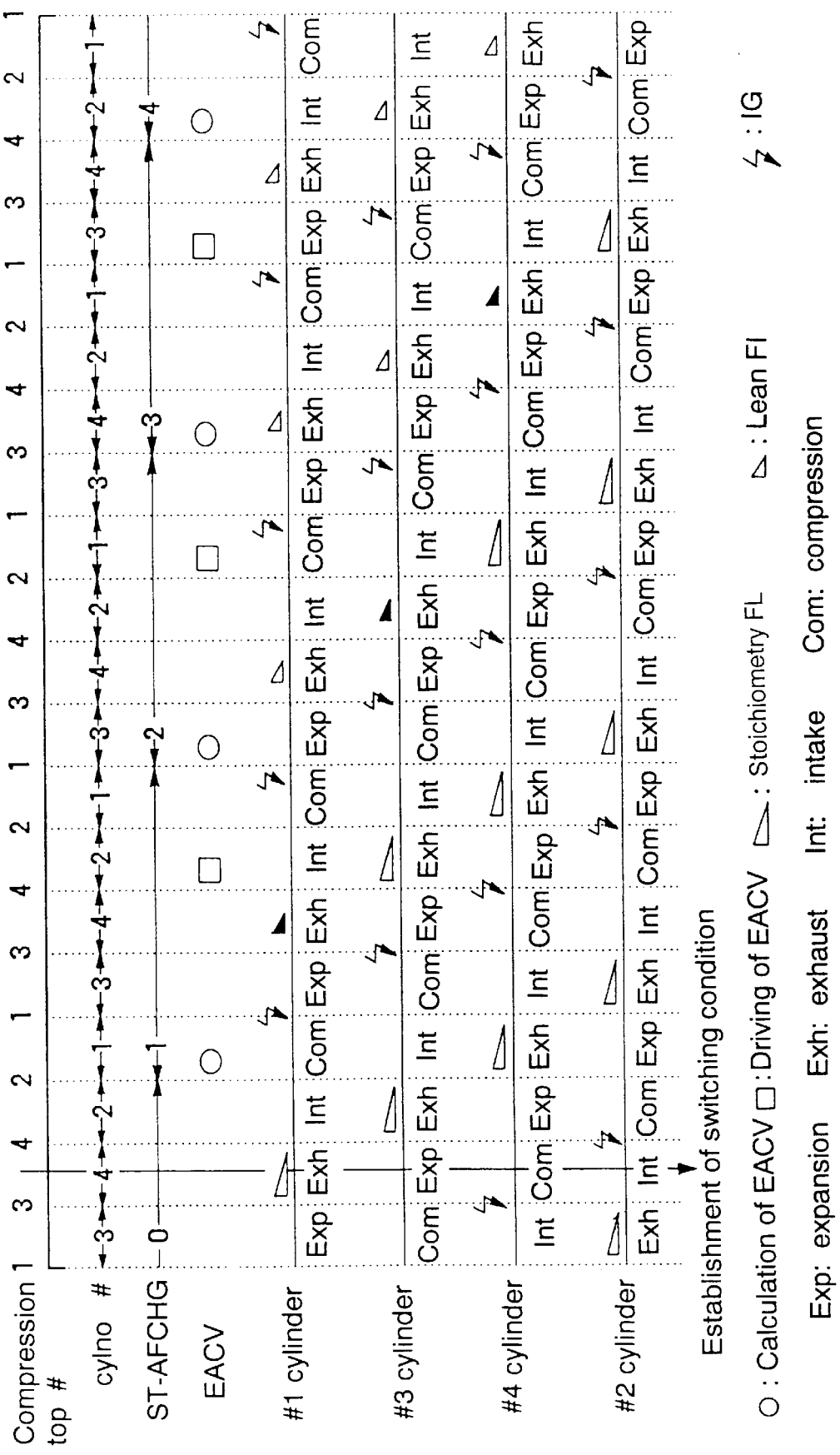
FIG. 9 is a timing chart of a third embodiment of the present invention.

FIG. 9 illustrates a third embodiment of the present invention, in which the air-fuel ratio is switched from the rich to the lean, and which has different features in that the switching of the air-fuel ratio is carried out in the order of #1 cylinder $3_1$→#3 cylinder $3_3$→#4 cylinder $3_4$→#2 cylinder $3_2$ and in that all the initial values of the interval counters cnt-STEP1, cnt-STEP2 and cnt-STEP3 are "2".

Figure 10:
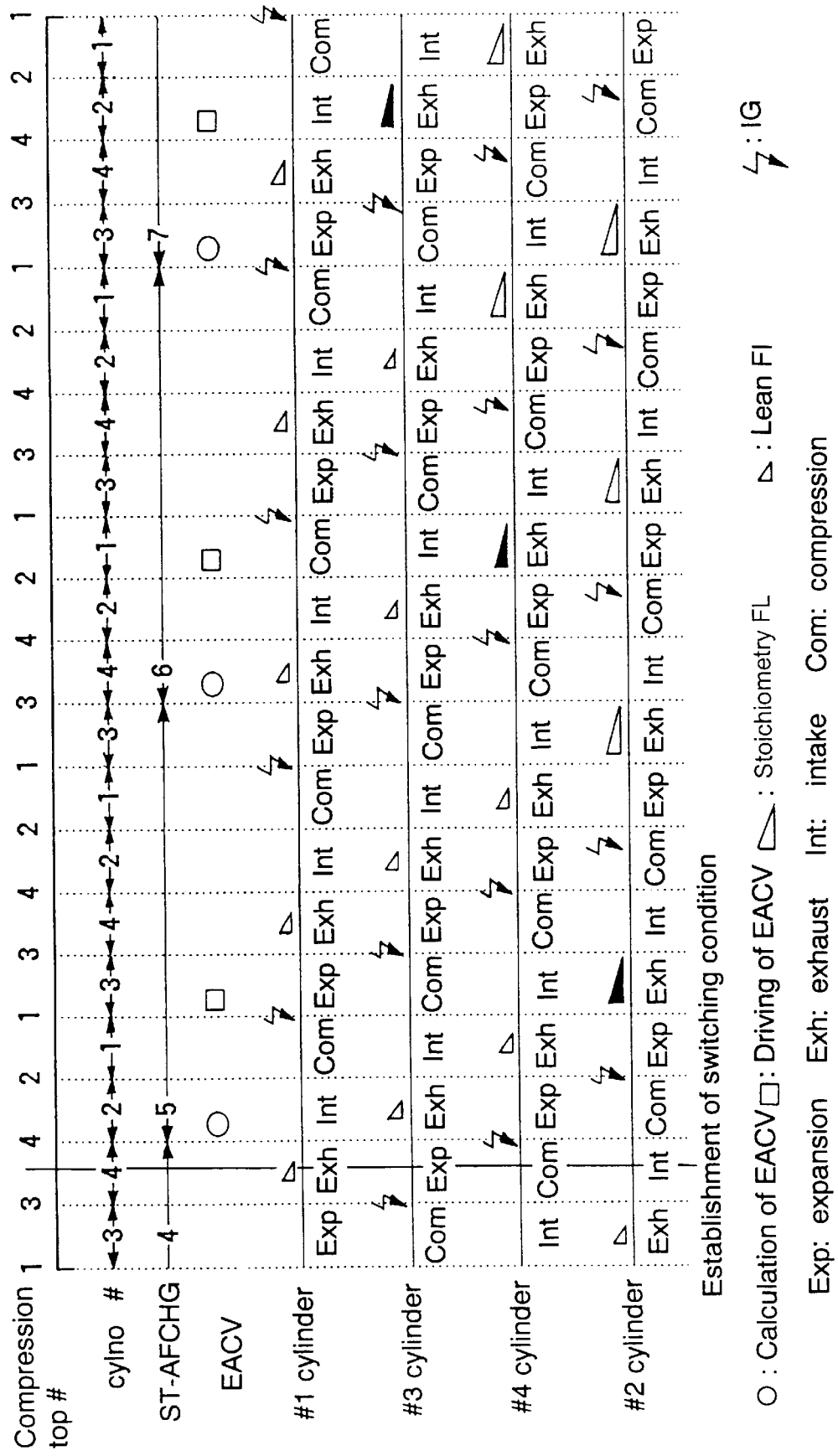
FIG. 10 is a timing chart of a fourth embodiment of the present invention.

FIG. 10 illustrates a fourth embodiment of the present invention, in which the air-fuel ratio is switched from the lean to the rich and which has different features in that the switching of the air-fuel ratio is carried out in the order of #2 cylinder $3_2$→#4 cylinder $3_4$→#3 cylinder $3_3$→#1 cylinder $3_1$ and in that all the initial values of the interval counters cnt-STEP1, cnt-STEP2 and cnt-STEP3 are "2".

Since the initial values of the interval counters are set at "2" in this manner, the timing of switching the status is delayed and the interval is prolonged, as compared with the second embodiment in which all the initial values are "1".

A fifth embodiment of the present invention will now be described in connection with FIGS. 11 to 15.

Figure 11:
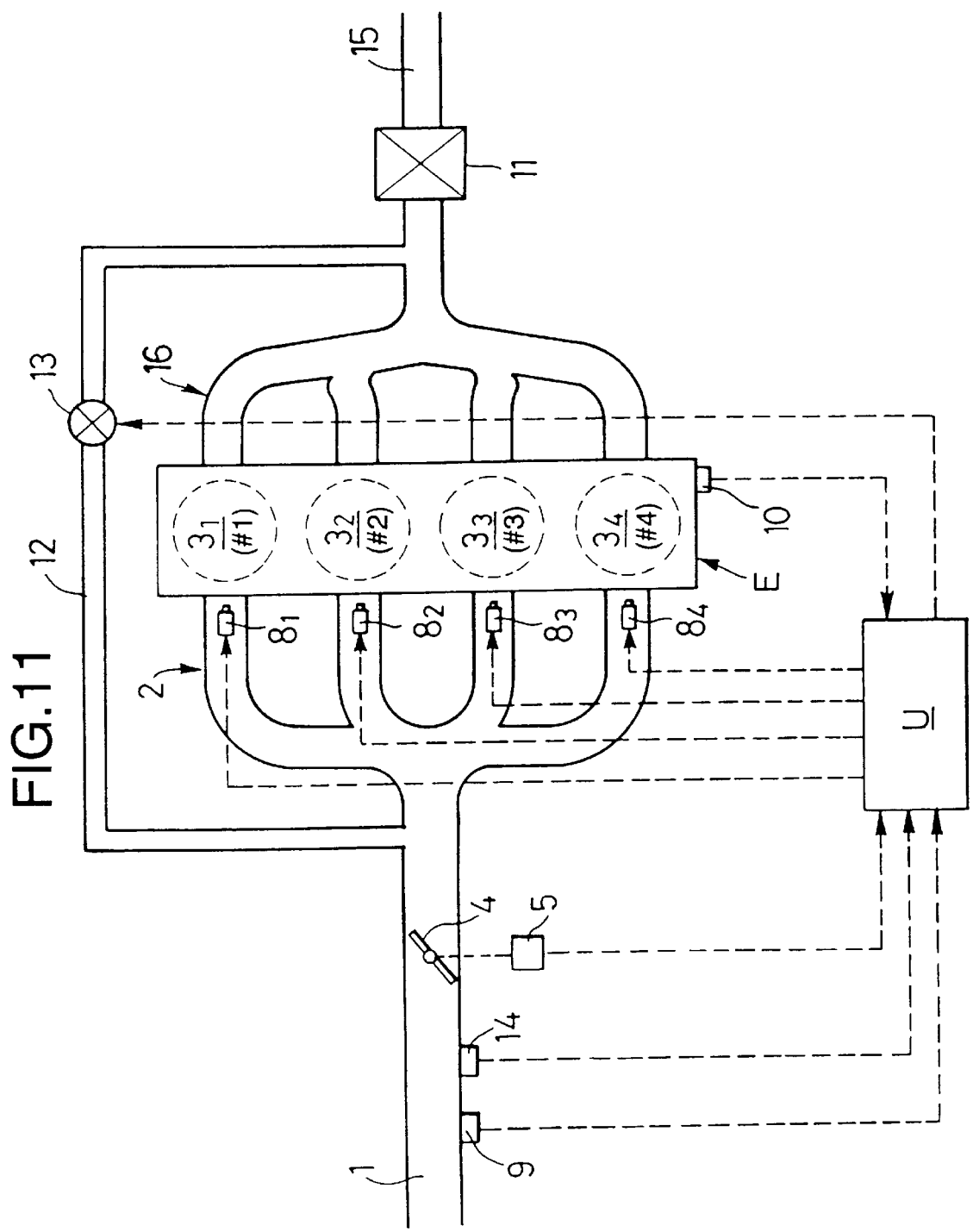

As apparent from the comparison of FIG. 11 with FIG. 1, the bypass passage 6 with the EACV 7 are not mounted on the intake passage 1 of the engine E in the fifth embodiment, and an intake pipe internal absolute pressure sensor 14 for detecting an intake pipe internal absolute pressure $P_B$ is provided and connected to the electronic control unit U. A ternary catalyst 11 for purifying an exhaust gas is provided in an exhaust passage 15 which is connected to the engine E through an exhaust manifold 16. The exhaust passage 15 and the intake passage 1 are interconnected by an EGR (Exhaust Gas Recirculation) gas passage 12, and an EGR valve 13 is provided in the EGR gas passage 12 and connected to the electronic control unit U in order to control the amount of EGR gas circulated. In all other respects, the embodiment of FIG. 11 is the same as FIG. 1 and will not be redescribed.

Figure 12:
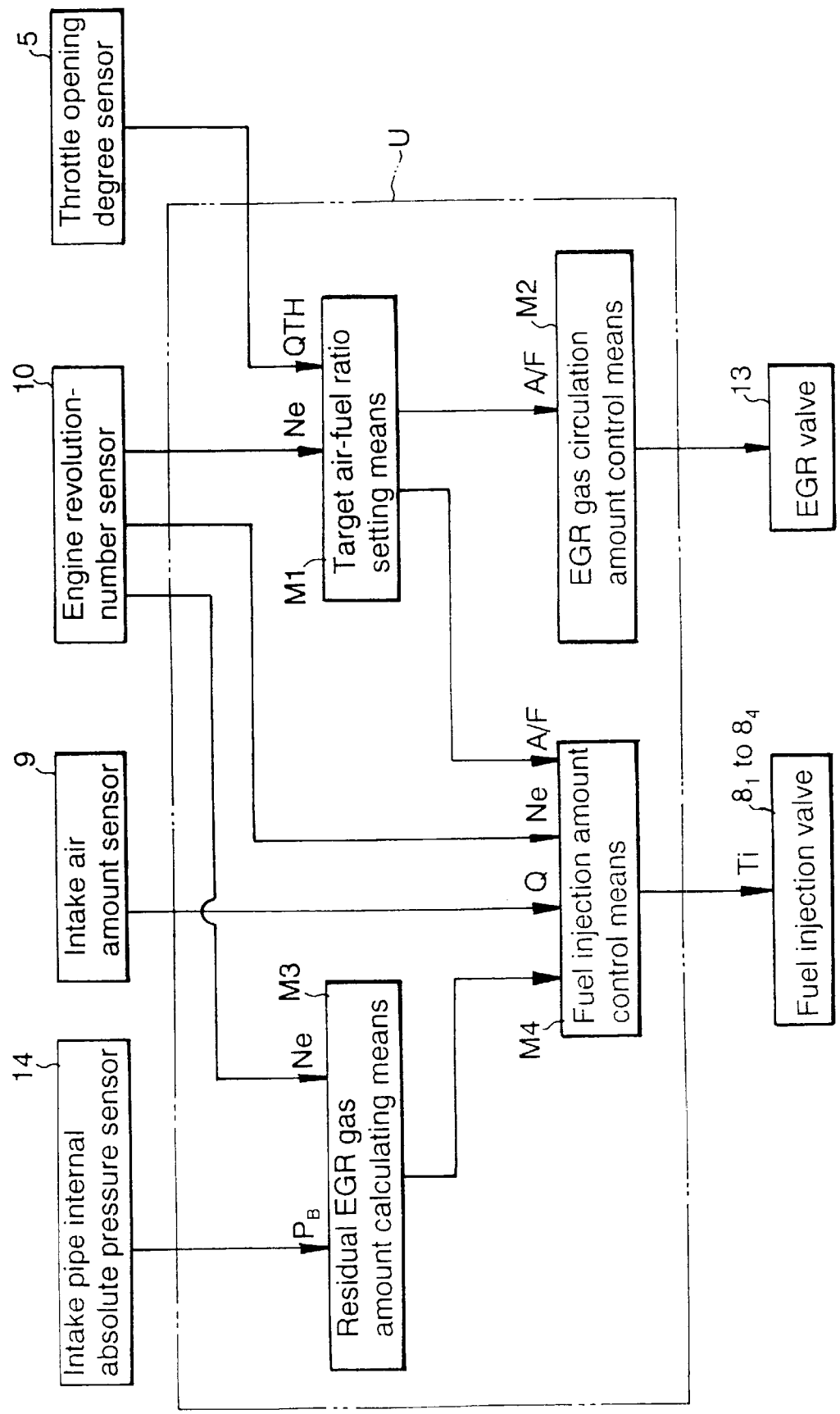

As shown in FIG. 12, the electronic control unit U includes a target air-fuel ratio setting means M1 for switching the target air-fuel ratio A/F based on the operational state of the engine E, an EGR gas circulation amount controlling means M2 for controlling the opening degree of the EGR valve 13 based on the target air-fuel ratio, a residual EGR gas amount calculating means M3 for calculating an amount of a residual gas in the intake system based on the operational state of the engine E, and a fuel injection amount controlling means M4 for controlling the time of injection of the fuel by each of the fuel injection valves $8_1$, $8_2$, $8_3$ and $8_4$ based on the operational state of the engine E as well as outputs from the target air-fuel ratio setting means M1 and the residual EGR gas amount calculating means M3.

A throttle opening degree θTH detected by the throttle opening degree sensor 5 and an engine revolution-number Ne detected by the engine revolution-number sensor 10 are supplied to the target air-fuel ratio setting means M1, and a target air-fuel ratio is map-searched based on these values of throttle opening degree θTH and engine revolution-number Ne. In a usual operational range of the engine E, the target air-fuel ratio is set at the stoichiometry (rich) value, i.e., at 14.7 which is a theoretical value. On the other hand, in a particular operational range such as during speed-reduction of the engine E, the target air-fuel ratio is leaned, for example, to 22 in order to provide an improvement in specific fuel consumption.

When the target air-fuel ratio has been switched from the stoichiometry to the lean by the target air-fuel ratio setting means M1, the EGR gas circulation amount controlling means M2 decreases the opening degree of the EGR valve 13 to limit the amount of EGR gas circulated, or closes the EGR valve 13 to stop the circulation of the EGR gas.

Figure 14:
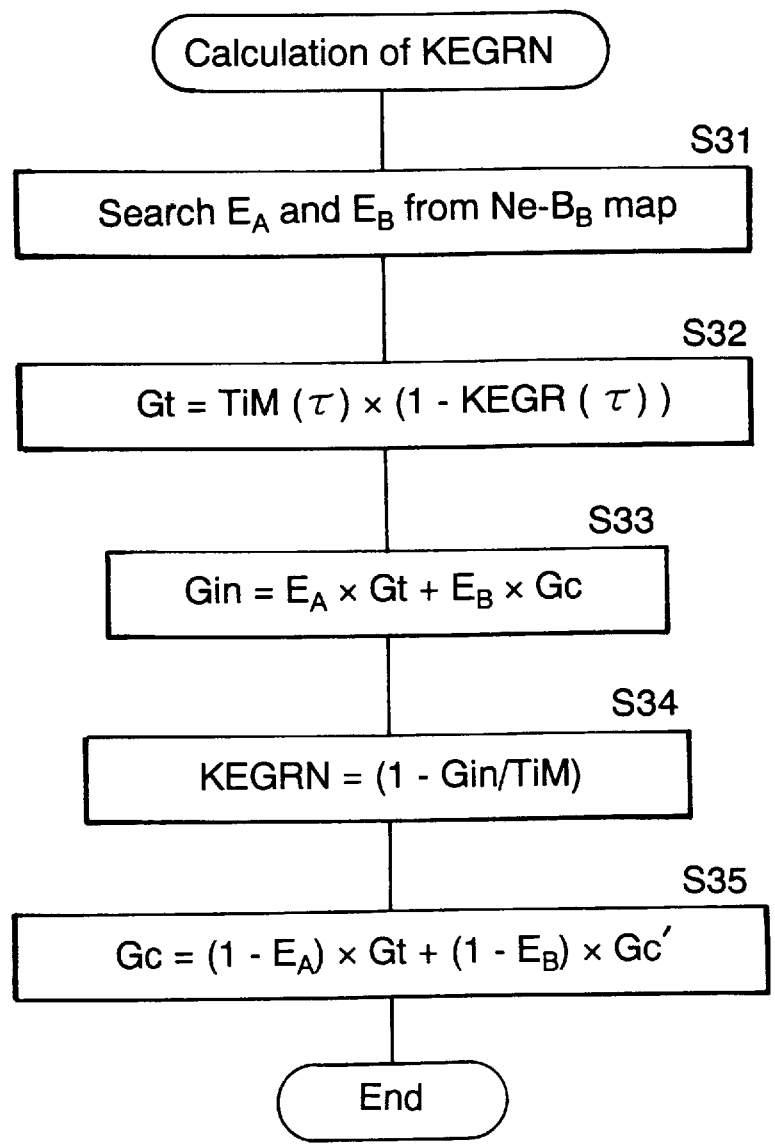

The operation of the residual EGR gas amount calculating means M3 will be described in detail hereinafter with reference to a flow chart in FIG. 14.

When the target air-fuel ratio is a theoretical air-fuel ratio, the fuel injection amount controlling means M4 sets a fuel injection time Ti corresponding to an air intake amount Q detected by the intake air amount sensor 9 and an engine revolution number Ne detected by the engine revolution-number sensor 10, so that such theoretical air-fuel ratio is provided. On the other hand, when the target air-fuel ratio has been leaned into a value leaner than the theoretical air-fuel ratio, the fuel injection amount controlling means M4 sets a fuel injection time Ti, so that such leaned target air-fuel ratio is provided. When the target air-fuel ratio is switched, the fuel injection amount controlling means M4 controls the timing of changing the fuel injection time Ti with a predetermined time difference (which will be described hereinafter) for each of the cylinders $3_1$, $3_2$, $3_3$ and $3_4$.

The operation of the fifth embodiment will be described below with reference to a flow chart in FIG. 13.

First, when a target air-fuel ratio switching condition has been newly established based on the operational state of the engine E at step S1, the EGR valve is closed by an instruction from the electronic control unit U at step S2 to decrease the amount of EGR gas reaching the cylinders. Then, a net EGR factor KEGRN is calculated at step S3. The net ECR factor KEGRN corresponds to the amount of residual EGR gas remaining in the intake system.

The specified contents of step S3 will be described with reference to a flow chart in FIG. 14, which step is a loop that is performed repeatedly and continuously during operation of the system. First, at step S31, an EGR direct rate $E_A$ and EGR carrying-away rate $E_B$ are searched from an Ne-$P_B$ map based on the engine revolution number Ne detected by engine revolution-number sensor 10 and the intake pipe internal absolute pressure $P_B$ detected by the intake pipe internal absolute pressure sensor 14. Then, an amount Gt of EGR gas passed through the EGR valve 13 is calculated at step S32 according to the following expression:

$$Gt=TiM(\tau)\times(1-KEGR(\tau))$$

wherein TiM(τ) is a fuel injection time Ti before τTDC, and KEGR(τ) is an EGR factor before τTDC.

Then, an amount Gin of EGR gas drawn into the cylinder is calculated at step S33 according to the following expression:

$$Gin=E_A\times Gt+E_B\times Gc$$

wherein Gc is an amount of EGR gas resident within the intake passage 1 that is calculated at step S35, in each repetition of the loop. In the first loop after the power is turned ON, a predetermined value of Gc is assumed in this step S33.

Then, a net EGR factor KEGRN is calculated at step S34 according to the following expression:

$$KEGRN=(1-Gin/TiM)$$

wherein TiM is the current fuel injection time Ti.

Finally, an amount Gc of EGR gas resident within the intake passage 1 is calculated at step S35 according to a following expression:

$$Gc=(1-E_A)\times Gt+(1-E_B)\times Gc'$$

wherein Gc' is the above-described predetermined value that is assumed for the first loop and thereafter Gc' is the value of Gc calculated in the previous loop at this step S35.

Figure 13:
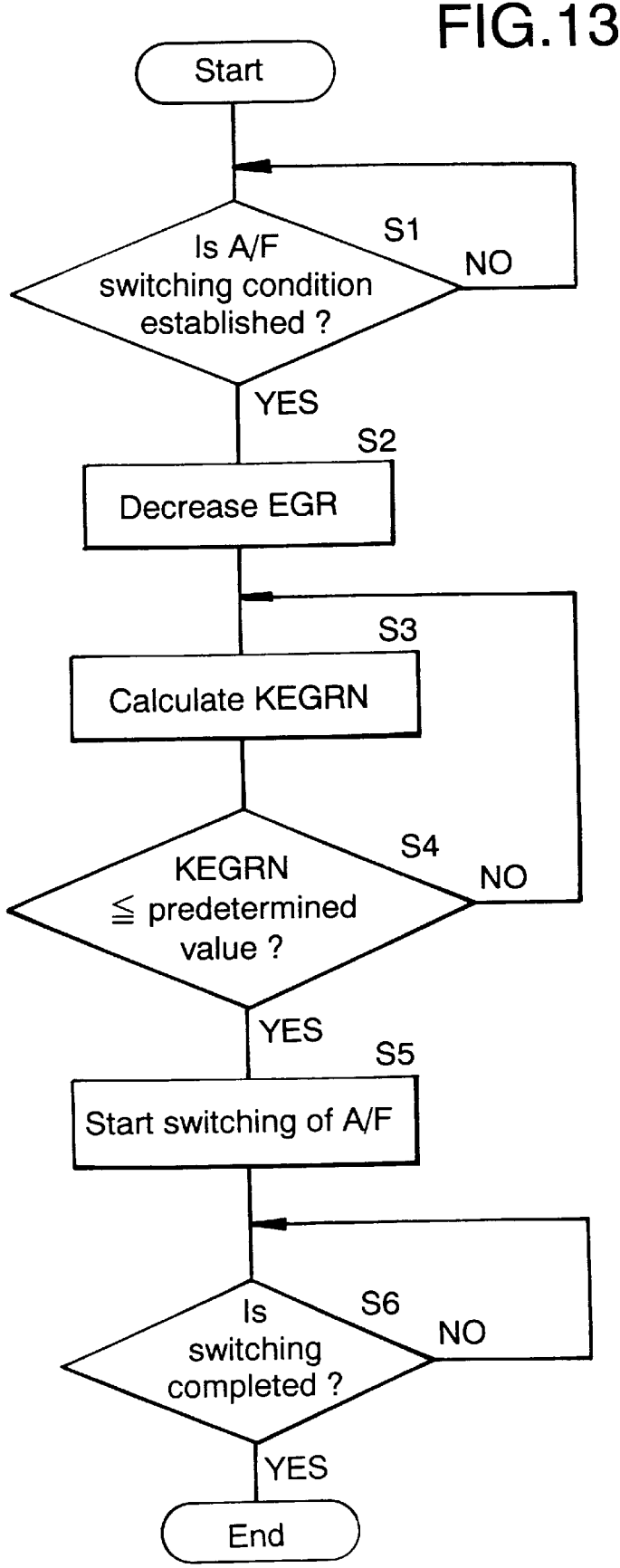

If the net EGR factor KEGRN becomes equal to or less than a predetermined value at step S4 in FIG. 13, i.e., if the amount of EGR gas resident within the intake system becomes equal to or less than a predetermined value, the processing is advanced to step S5, at which the switching of the air-fuel ratio is started. If the switching of the air-fuel ratio is completed at step S6, this routine is completed.

Figure 15:
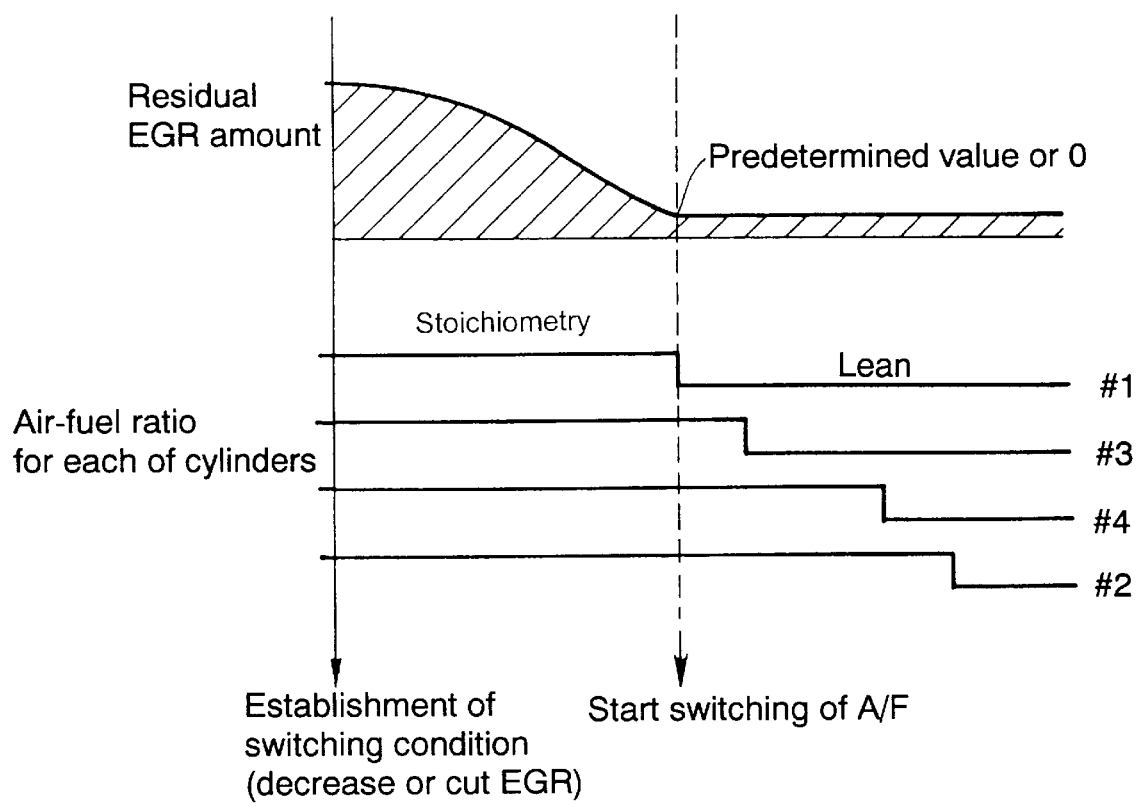

The above-described operation will be further described with reference to a timing chart in FIG. 15. If the target air-fuel ratio switching condition has been established to decrease the amount of ECR gas circulated, the net EGR factor is gradually decreased. If the net ECR factor becomes equal to or less than the predetermined value, the switching of the air-fuel ratio is started, whereby the amount of fuel injected by the fuel injection valve $8_1$ for the #1 cylinder $3_1$ is first decreased to change the air-fuel ratio for the #1 cylinder $3_1$ from the stoichiometry to the lean and then, the amounts of fuel injected by the fuel injection valves $8_3$, $8_4$ and $8_1$ for the #3, #4 and #1 cylinders $3_3$, $3_4$ and $3_1$ are sequentially decreased with predetermined time differences to change the air-fuel ratio from the stoichiometry to the lean.

In this manner, the switching of the air-fuel ratio is carried out after waiting for the net EGR factor to become equal to or less than the predetermined value after the amount of EGR gas circulated has been decreased. Therefore, the air-fuel ratio cannot be changed to the lean while the net EGR factor remains large. This prevents the generation of a combustion failure or a misfire. In addition, in switching the air-fuel ratio, the air-fuel ratios for the #1, #2, #3 and #4 cylinders are sequentially switched with the predetermined time differences rather than being simultaneously switched and therefore, a torque shock of the engine E can be prevented to provide an improved riding comfort.

In the fifth embodiment, when the target air-fuel ratio is near a lean limit, the amount of EGR gas circulated may be cut off to 0 at step S2 in the flow chart shown in FIG. 13. When the net EGR factor KEGRN has become 0 at step S4, the switching of the air-fuel ratio may be started. In doing so, even when the target air-fuel ratio is near the lean limit, the generation of a combustion failure or a misfire can be reliably prevented.

Figure 17:
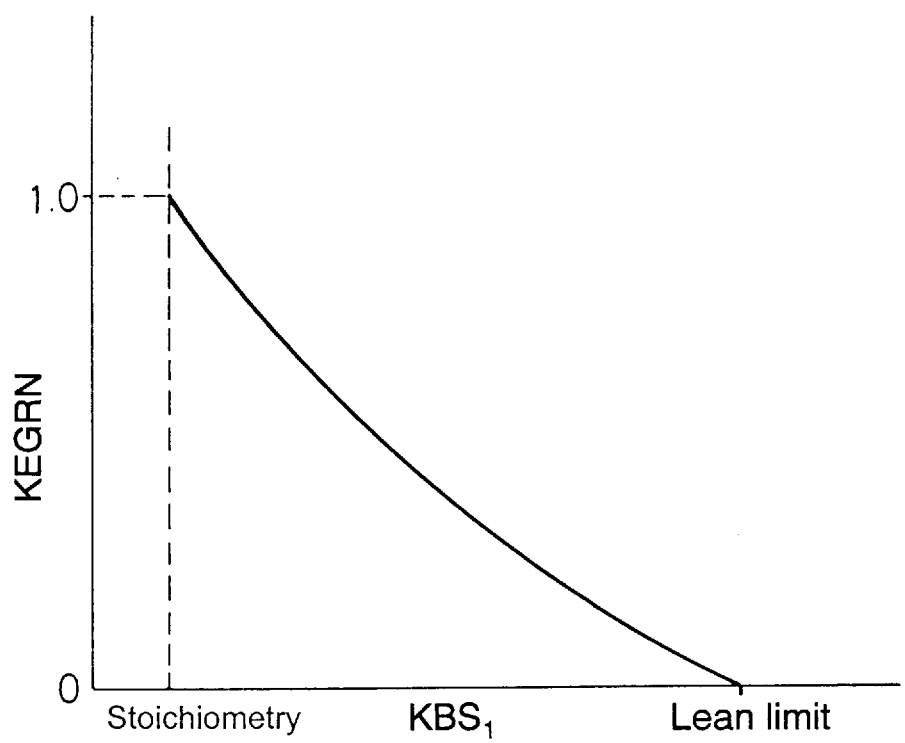
Figure 18:
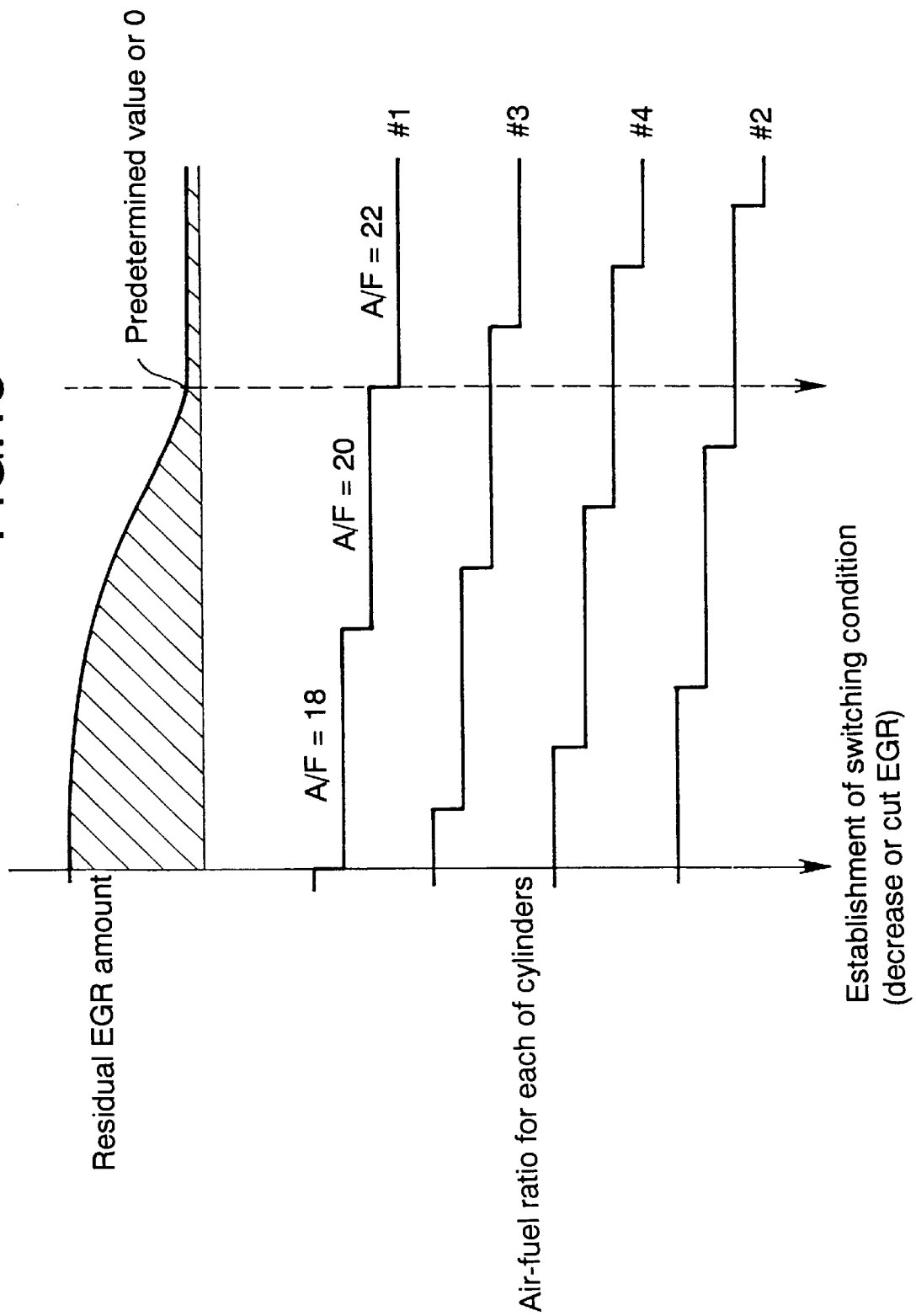

A sixth embodiment of the present invention will now be described with reference to FIGS. 16 to 18.

First, when the target air-fuel ratio switching condition has been established based on the operational state of the engine E at step S11 (FIG. 16), the EGR valve 13 is closed by the instruction from the electronic control unit U at step S12 to decrease the amount of EGR gas circulated. Then, a switching flag FLGchg is set at "1" (corresponding to the completion of the switching) in a first loop, and hence, the processing is advanced to step S14, at which the switching flag FLGchg is set at "0" (corresponding to the incompletion of the switching).

Then, it is judged at step S15 whether or not the current net EGR factor KEGRN is equal to or less than a predetermined value. In the first loop immediately after the decreasing of the amount of EGR gas circulated, the net EGR factor KEGRN is not equal to or less than the predetermined value and hence, the processing is advanced to step S16, at which a searching is carried out in KEGRN/KBS$_1$ Table shown in FIG. 17. More specifically, a target air-fuel ratio KBS$_1$ is searched in accordance with the net EGR factor KEGRN. Then, the target air-fuel ratio KBS$_1$ is compared with a medium target air-fuel ratio at step S17. The medium target air-fuel ratio is varied toward the lean, as the net EGR factor KEGRN is decreased.

If the medium target air-fuel ratio is set in this manner, the leaning of the air-fuel ratio for each of the cylinders is carried out, so that the medium target air fuel ratio is provided. This leaning of the air-fuel ratio is carried out with predetermined time differences in the order of #1 cylinder $3_1$, #2 cylinder $3_2$, #3 cylinder $3_3$ and #4 cylinder $3_4$, as in the fifth embodiment. The leaning of the air-fuel ratio for the cylinders $3_1$, $3_2$, $3_3$ and $3_4$ is repeated in accordance with the variation in the medium target air-fuel ratio, until the switching of the air-fuel ratio is finally completed at step S19. If the current net EGR factor KEGRN soon becomes equal to or less than the predetermined value, a target air-fuel ratio KBS$_{LL}$ at the time of establishment of the switching condition is set at a final target air-fuel ratio at step S20, and the air-fuel ratio for each of the cylinders $3_1$, $3_2$, $3_3$ and $3_4$ is switched at step S18, so that such final target air-fuel ratio is obtained.

When the switching of the air-fuel ratio has been finally completed at step S19, the processing is advanced to step S21, at which the switching flag FLGchg is set at 21" (corresponding to the completion of the switching).

Figure 16:
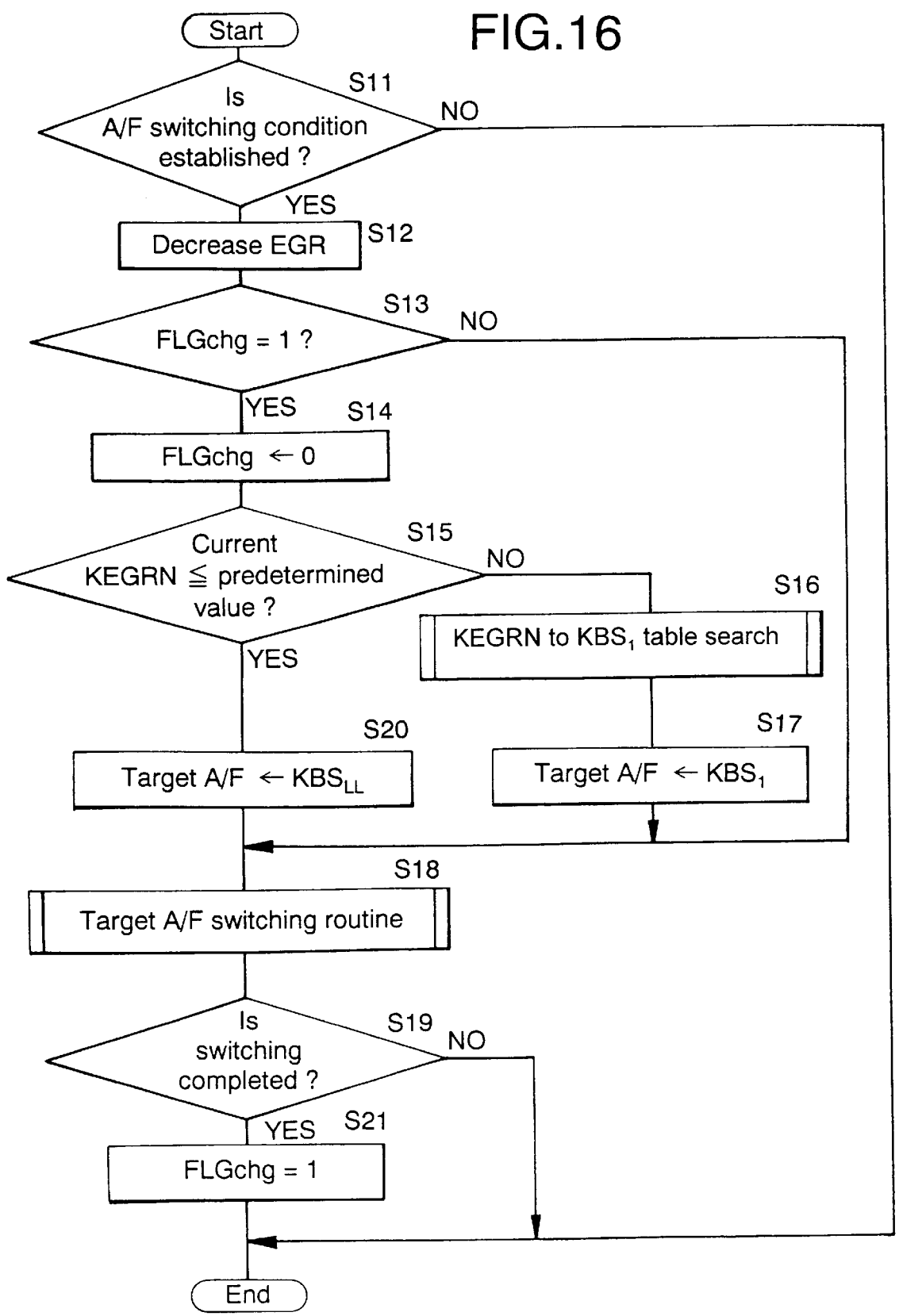

It should be noted that if the target air-fuel ratio KBS$_{LL}$ at the time of establishment of the switching condition is near a lean limit, the amount of EGR gas circulated may be cut to 0 at step S12 in the flow chart of FIG. 16. When the net EGR factor KEGRN has become 0 at step S15, the target air-fuel ratio KBS$_{LL}$ may be set at the final target air-fuel ratio at step S20. In doing so, even when the target air-fuel ratio KBS$_{LL}$ is near a lean limit, the generation of a combustion failure or a misfire can be reliably prevented.

As described above, the air-fuel ratio is switched toward the lean in accordance with the net EGR factor KEGRN and therefore, even if a situation with the medium air-fuel ratio is generated, the degradation of the emission is prevented by the presence of the residual EGR gas in an amount corresponding to such situation. Moreover, in switching the air-fuel ratio from the stoichiometry to the lean, the air-fuel ratio is stepwise switched toward the lean in accordance with the decrease in net EGR factor KEGRN simultaneously with the establishment of the air-fuel ratio switching condition. Therefore, the timing of leaning the air-fuel ratio is not delayed to degrade the fuel consumption rate, and while the air-fuel ratio remains at the stoichiometry, the amount of EGR gas circulated is not decreased to degrade the emission.

A seventh embodiment of the present invention will now be described with reference to FIGS. 19 to 24.

Figure 19:
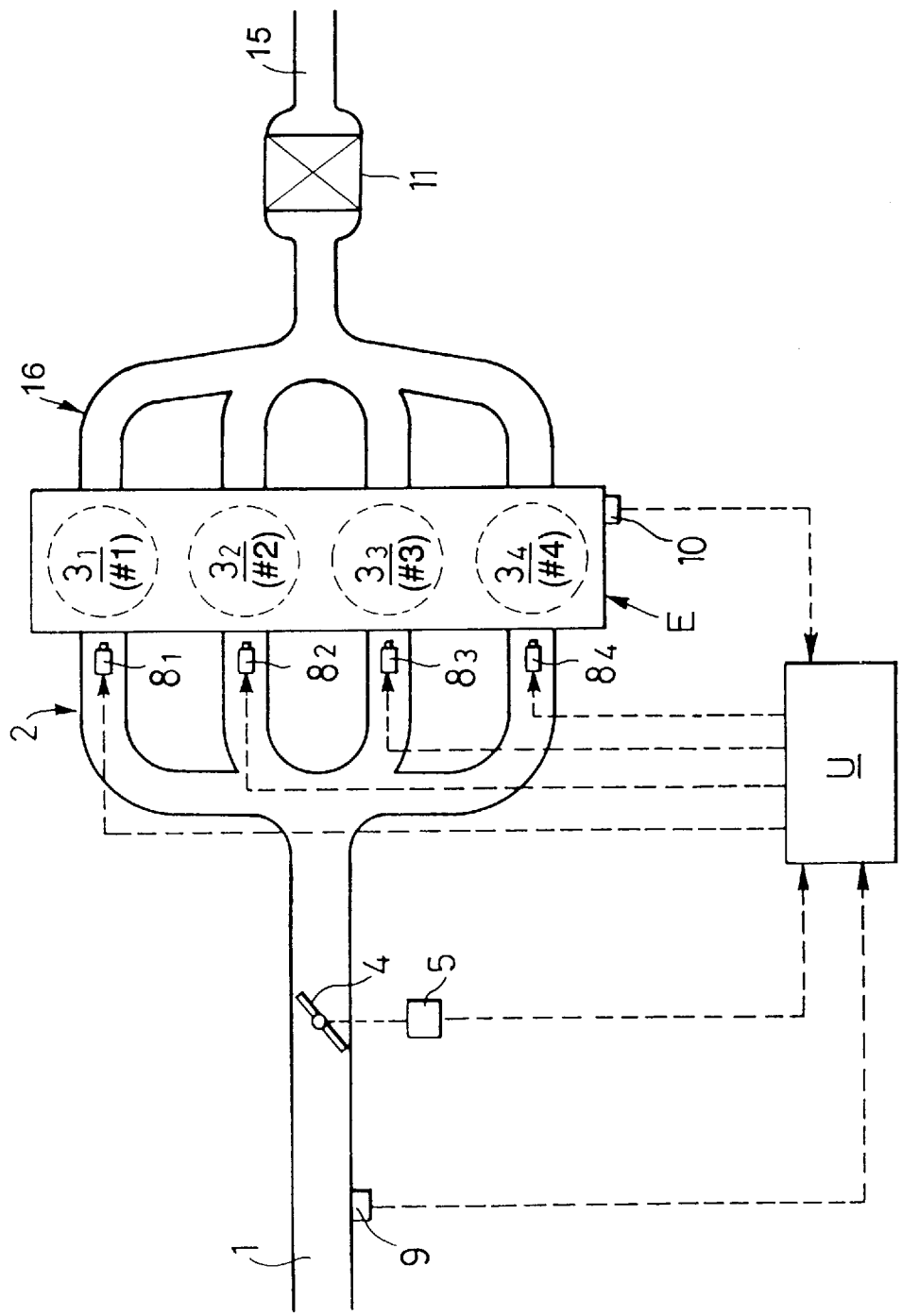

As is apparent from the comparison of FIG. 19 with FIG. 11, an engine E in this embodiment has a construction such that the EGR passage 12, the EGR valve 13 and the intake pipe internal absolute pressure sensor 14 are eliminated from the engine E shown in FIG. 11. In all other respects, the embodiment of FIG. 19 is the same as FIG. 11 and will not be redescribed.

The operation of the seventh embodiment will be described below.

Figure 20:
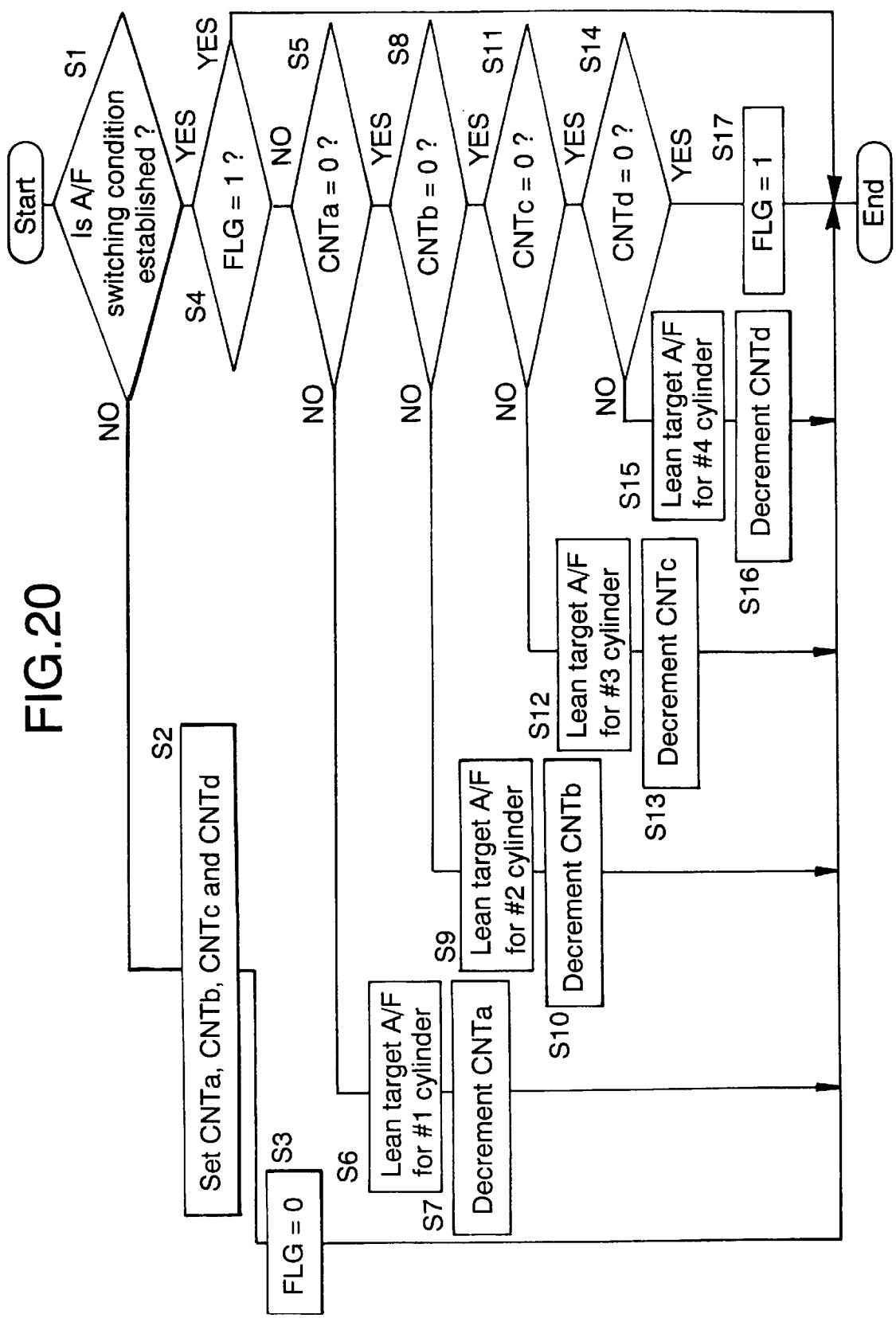

A program shown in the flow chart in FIG. 20 is carried out at every TDC. First, if the target air-fuel ratio switching condition is not established at step S1, each of four TDC counters CNTa, CNTb, CNTc and CNTd provided in correspondence to four (#1 a, #2=b, #3=c and #4=d) cylinders $3_1$, $3_2$, $3_3$ and $3_4$ are set at a predetermined initial value at step S2, and a switching completion flag FLG is set at "0" at step S3. The TDC counters CNTa, CNTb, CNTc and CNTd are decremented upon every detection of TDC after the start of counting. The switching completion flag FLG is set at "1" when the switching of the target air-fuel ratio has been completed (step S17 described below), and at "0" when the switching is not completed (step S3).

If it is decided at step S1 based on the operational state of the engine E that the target air-fuel ratio switching condition has been established, if the switching flag FLG is not set at "1" at step S4 (i.e., the target air-fuel ratio is uncompleted), and if the TDC counter CNTa has not reached a count-up at step S5, the air-fuel ratio for the #1 cylinder is switched from the stoichiometry (rich) to the lean by decreasing the amount of fuel injected into the #1 cylinder at step S6.

The judgment of the switching of the target air-fuel ratio is carried out by map-searching the target air-fuel ratio A/F based on the throttle opening degree θTH detected by the throttle opening degree sensor 5 and the engine revolution number Ne detected by the engine revolution-number sensor 10. In a usual operational range of the engine E, the target air-fuel ratio is set at the stoichiometry value, i.e., at 14.7 which is a theoretical air-fuel ratio (A/F=14.7). In a particular operational range such as during speed-reduction of the engine E, the target air-fuel ratio is leaned, for example to A/F=22 in order to provide an improvement in specific fuel consumption.

When the target air-fuel ratio is the theoretical air-fuel ratio, the control of the amount of fuel injected from each of the fuel injection valves $8_1$, $8_2$, $8_3$ and $8_4$ is performed by setting a fuel injection time Ti corresponding to the air intake amount Q detected by the intake air amount sensor 9 and the engine revolution number Ne detected by the engine revolution-number sensor 10, so that such theoretical air-fuel ratio is obtained. On the other hand, when the target air-fuel ratio has been leaned into a value leaner than the theoretical air-fuel ratio, the control of the amount of fuel injected is performed by setting a fuel injection time Ti, so that such leaned target air-fuel ratio is reached.

When the air-fuel ratio for the #1 cylinder has been leaned in the above manner at step S6, the TDC counter CNTa corresponding to the #1 cylinder is decremented at step S7. Steps S6 and S7 are continued until the TDC counter CNTa reaches the count-up (0) at step S5. Therefore, during such continuation, only the air-fuel ratio for the #1 cylinder is leaned, and those for the remaining #2, #3 and #4 cylinders are maintained at stoichiometry.

When a predetermined number of TDCs has been detected after the leaning of the air-fuel ratio for the #1 cylinder, whereby the TDC counter CNTa has reached the count-up at step S5 and the TDC counter CNTb has not reached the count-up at step S8, the air-fuel ratio for the #2 cylinder is switched from the stoichiometry to the lean by decreasing the amount of fuel injected into the #2 cylinder at step S9, and the TDC counter CNTb corresponding to the #2 cylinder is decremented at step S10.

Steps S9 and S10 are continued until the TDC counter CNTb reaches the count-up (0) at step S8. Therefore, during such continuation, only the air-fuel ratios for the #1 cylinder and #2 cylinder are leaned, and those for the remaining #3 and #4 cylinders are maintained at the stoichiometry.

When the predetermined number of TDCs has been detected after leaning of the air-fuel ratio for the #2 cylinder, whereby the TDC counter CNTb has reached the count-up at step S8 and the TDC counter CNTc has not reach the count-up at step S11, the air-fuel ratio for the #3 cylinder is switched from the stoichiometry to the lean by the decreasing the amount of fuel injected into the #3 cylinder at step S12, and the TDC counter CNTc corresponding to the #3 cylinder is decremented at step S13.

Steps S12 and S13 are continued until the TDC counter CNTc reaches the count-up (0) at step S11. Therefore, during such continuation, only the air-fuel ratios for the #1, #2 and #3 cylinders are leaned, and the air-fuel ratio for the remaining #4 cylinder is maintained at the stoichiometry.

When the predetermined number of TDCs has been detected after leaning of the air-fuel ratio for the #3 cylinder, whereby the TDC counter CNTc has reached the count-up (0) at step S11 and the TDC counter CNTd does not reach the count-up at step S14, the air-fuel ratio for the #4 cylinder is switched from the stoichiometry to the lean by decreasing the amount of fuel injected into the #4 cylinder at step S15, and the TDC counter CNTd corresponding to the #4 cylinder is decremented at step S16.

Steps S15 and S16 are continued until the TDC counter CNTd reaches the count-up. When the TDC counter CNTd has reached the count-up (0) at step S14, the switching flag FLG is set at "1" from the decision of the fact that the switching of the target air-fuel ratio has been completed. Therefore, after leaning of the air-fuel ratio for the #4 cylinder at step S15, the air-fuel ratios for all the #1, #2, #3 and #4 cylinders are brought into lean values.

The timing for switching the air-fuel ratio for each of the #1, #2, #3 and #4 cylinders $3_1$, $3_2$, $3_3$, and $3_4$ can be set at any value by changing the initial values of the TDC counters CNTa to CNTd.

The torque shock of the engine E can be minimized, while avoiding a condition with the medium air-fuel ratio at which the amount of $NO_x$ discharged is increased, by switching the air-fuel ratios for the four cylinders $3_1$, $3_2$, $3_3$ and $3_4$ with the predetermined time differences, when the target air-fuel ratio has been switched from the stoichiometry to the lean, as described above.

Figure 21A:
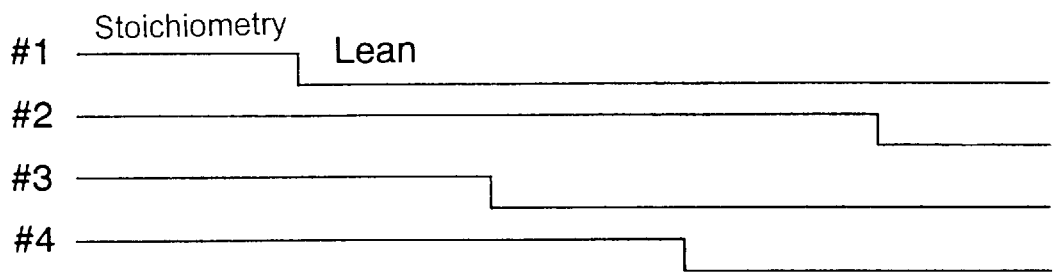
FIGS. 21A to 21C are timing charts for explaining the operation in switching the air-fuel ratio from the rich level to the lean level.
Figure 21B:
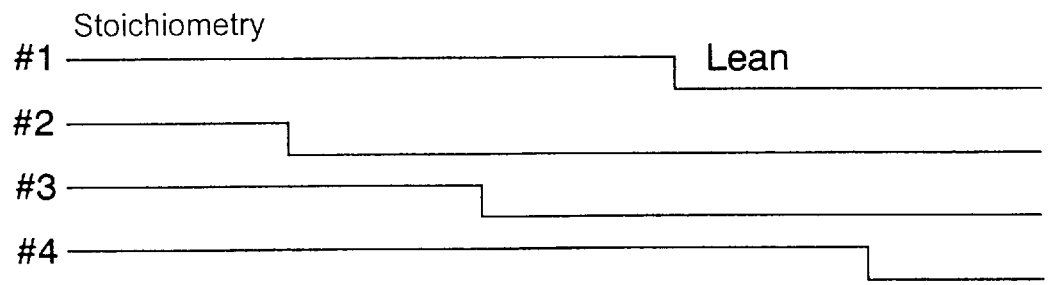
Figure 21C:
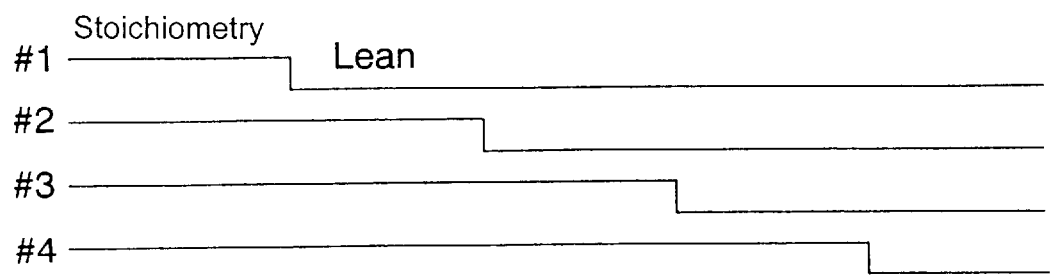

In the present embodiment, a further decrease in the amount of $NO_x$ discharged is provided by defining the order of switching of the air-fuel ratios for the cylinders $3_1$, $3_2$, $3_3$ and $3_4$. Examples, in which the target air-fuel ratio is switched from the stoichiometry to the lean, will be described with reference to FIGS. 21A, 21B and 21C and FIG. 22. In any of examples (A), (B) and (C) in FIGS. 21A, 21B, 21C and FIG. 22, the order of discharge of an exhaust gas (i.e., the order of ignition) or firing order is the same and set at an order of #1 cylinder $3_1 \rightarrow$#3 cylinder $3_3 \rightarrow$#4 cylinder $3_4 \rightarrow$#2 cylinder $3_2$. In place of the order of switching of the air-fuel ratios generally set at the order of #1 cylinder$\rightarrow$#2 cylinder$\rightarrow$#3 cylinder$\rightarrow$#4 cylinder in the flow chart in FIG. 20, as shown in FIG. 21C as Example (c) the order of switching the air-fuel ratios is set at an order of #1 cylinder $3_1 \rightarrow$#3 cylinder $3_3 \rightarrow$#4 cylinder $3_4 \rightarrow$#2 cylinder $3_2$ in the example (A), and at an order of #2 cylinder $3_2 \rightarrow$#3 cylinder $3_3 \rightarrow$#1 cylinder $3_1 \rightarrow$#4 cylinder $3_4$ in the example (B).

Suppose the time where the air-fuel ratios for two of the four cylinders $3_1$, $3_2$, $3_3$ and $3_4$ become leaned, i.e., the period from the leaning of the air-fuel ratio for the "#2 (second) cylinder at step S9 up to the leaning of the air-fuel ratio for the #3 (third) cylinder at step S12. In this case, in the example (A), the order of discharge of the exhaust gas from the #1 and #3 cylinders $3_1$ and $3_3$ which are in lean conditions is continuous, while the order of discharge of the exhaust gas from the #4 and #2 cylinders $3_4$ and $3_2$ which are in stoichiometrical conditions is continuous, and the #3 cylinder which is in the lean condition is located between the #4 and #2 cylinders $3_4$ and $3_2$ which are in the stoichiometrical conditions.

In the example (B), the order of discharge of the exhaust gas from the cylinders which are in the lean conditions (#2 and #3 cylinders $3_2$ and $3_3$) and the cylinders which are in the stoichiometrical conditions (#1 and #4 cylinders $3_1$ and $3_4$) is an alternative, and the two cylinders which are in the lean conditions (#2 and #3 cylinders $3_2$ and $3_3$) are located between the two cylinders which are in the stoichiometrical conditions (#1 and #4 cylinders $3_1$ and $3_4$).

In the example (C), the order of discharge of the exhaust gas from the two cylinders which are in the lean conditions (#1 and #2 cylinders $3_1$ and $3_2$) is continuous, while the order of discharge of the exhaust gas from the two cylinders which are in the stoichiometrical conditions (#3 and #4 cylinders $3_3$ and $3_4$) is continuous, and the two cylinders which are in the stoichiometrical conditions (#3 and #4 cylinders $3_3$ and $3_4$) are located adjacent each other.

Thus, in the examples (A) and (C), because the order of discharge of the exhaust gas from the two cylinders which are in the stoichiometrical conditions is continuous, the exhaust gas from the two cylinders which are in the stoichiometrical conditions may be seldom diluted by the exhaust gas from the two remaining cylinders which are in the lean conditions, and the exhaust emission purifying performance of the exhaust emission control catalyst 11 can be maintained at a high level to inhibit an increase in the amount of $NO_x$ discharged. On the other hand, in the example (B), the cylinders in the stoichiometrical conditions and the cylinders in the lean conditions alternately discharge the exhaust gas and for this reason, the exhaust gas from the cylinders in the stoichiometrical conditions is diluted by the exhaust gas from the cylinders in the lean conditions, resulting in a reduced exhaust emission purifying performance of the exhaust emission control catalyst 11.

In the example (C), because the two cylinders in the stoichiometrical conditions are located adjacent each other, the exhaust gas from such two cylinders may be seldom mixed with and diluted by the exhaust gas from the two remaining cylinders in the lean conditions and hence, the exhaust emission purifying performance of the exhaust emission control catalyst 11 can be maintained at a high level to inhibit an increase in the amount of $NO_x$ discharged. On the other hand, in the examples (A) and (B), because the cylinder in the lean condition is located between the cylinders in the stoichiometrical conditions, the exhaust gas from the cylinders in the stoichiometrical conditions is diluted by the exhaust gas from the cylinder in the lean condition, resulting in a reduced exhaust emission purifying performance of the exhaust emission control catalyst 11.

As described above, the example (C) is convenient for the purifying performance of the exhaust emission control catalyst 11 from viewpoints of both the order of discharge of the exhaust gas from the cylinders $3_1$, $3_2$, $3_3$ and $3_4$ and the arrangement of the cylinders $3_1$, $3_2$, $3_3$ and $3_4$, and the example (A) is convenient for the purifying performance of the exhaust emission control catalyst 11 from a viewpoint of the order of discharge of the exhaust gas from the cylinders $3_1$, $3_2$, $3_3$ and $3_4$. However, the example (B) is inconvenient for the purifying performance of the exhaust emission control catalyst 11 from the viewpoints of both the order of discharge of the exhaust gas from the cylinders $3_1$, $3_2$, $3_3$ and $3_4$ and the arrangement of the cylinders $3_1$, $3_2$, $3_3$ and $3_4$.

Examples, in which the target air-fuel ratio is switched from the lean to the stoichiometry, will be described below with reference to FIGS. 23A, 23B, 23C and 24.

Figure 23A:
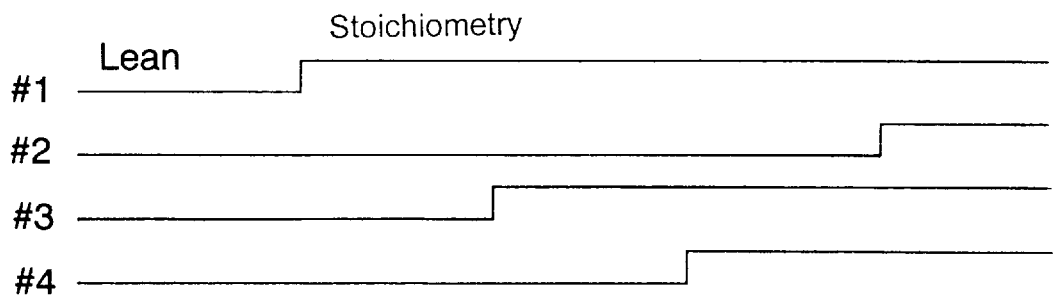
FIGS. 23A to 23C are timing charts for explaining the operation in switching the air-fuel ratio from the lean level to the rich level.
Figure 23B:
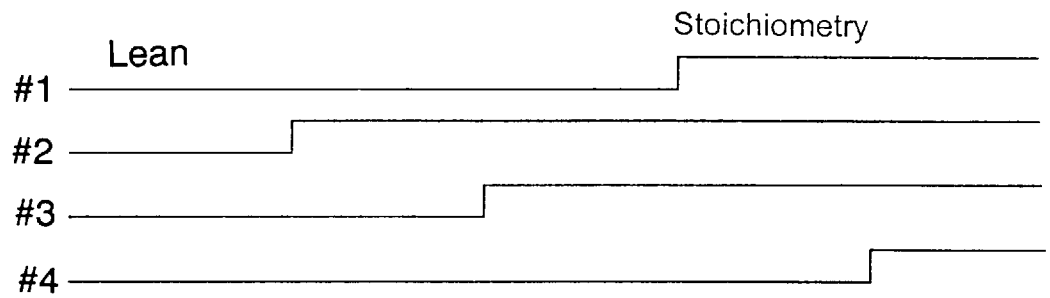
Figure 23C:
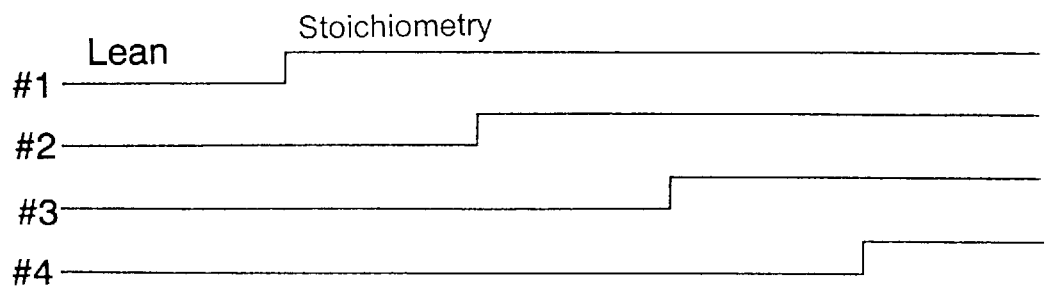

In any of the examples (D) to (F) in FIGS. 23A, 23B and 23C, the order of discharge of the exhaust gas (i.e., the order of ignition) is the same as the above-described switching from the stoichiometry to the lean and is set at an order of #1 cylinder $3_1$→#3 cylinder $3_3$→#4 cylinder $3_4$→#2 cylinder $3_2$. The order of switching of the air-fuel ratio is set in an order of #1 cylinder $3_1$→#3 cylinder $3_3$→#4 cylinder $3_4$→#2 cylinder $3_2$ in the example (D), an order of #2 cylinder $3_2$→#3 cylinder $3_3$→#1 cylinder $3_1$→#4 cylinder $3_4$ in the example (E), and an order of #1 cylinder $3_1$→#2 cylinder $3_2$→#3 cylinder $3_3$→#4 cylinder $3_4$ in the example (F).

As is apparent from FIG. 24, when the air-fuel ratio for two of the four cylinders $3_1$, $3_2$, $3_3$ and $3_4$ has been leaned, the order of discharge of the exhaust gas from the #1 and #3 cylinders $3_1$ and $3_3$ in the stoichiometrical conditions is continuous in the example (D), and the order of discharge of the exhaust gas from the #1 and #2 cylinders $3_1$ and $3_2$ in the stoichiometrical conditions is continuous in the example (F). For this reason, the exhaust gas from the two cylinders in the stoichiometrical conditions is seldom diluted by the exhaust gas from the two remaining cylinders in the lean conditions, and the exhaust emission purifying performance of the exhaust emission control catalyst 11 can be maintained at a high level to inhibit the amount of $NO_x$ discharged.

In the example (E), the #2 and #3 cylinders $3_2$ and $3_3$ in the stoichiometrical conditions are adjacent each other, and in the example (F), the #1 and #2 cylinders $3_1$ and $3_2$ are adjacent each other. Therefore, it is difficult for the exhaust gas from the cylinder in the stoichiometrical condition to be mixed with the exhaust gas from the cylinder in the lean condition, thereby making it possible to maintain the purifying performance of the exhaust emission control catalyst 11 at a high level.

As described above, the example (F) is convenient for the purifying performance of the exhaust emission control catalyst 11 from the viewpoints of both the order of discharge of the exhaust gas from the cylinders $3_1$, $3_2$, $3_3$ and $3_4$ and the arrangement of the cylinders $3_1$, $3_2$, $3_3$ and $3_4$; the example (D) is convenient for the purifying performance of the exhaust emission control catalyst 11 from the viewpoint of the order of discharge of the exhaust gas from the cylinders $3_1$, $3_2$, $3_3$ and $3_4$, and the example (E) is convenient for the purifying performance of the exhaust emission control catalyst 11 from the viewpoint of the arrangement of the cylinders $3_1$, $3_2$, $3_3$ and $3_4$.

An eighth embodiment of the present invention will now be described with reference to FIGS. 25 and 26.

Figure 25:
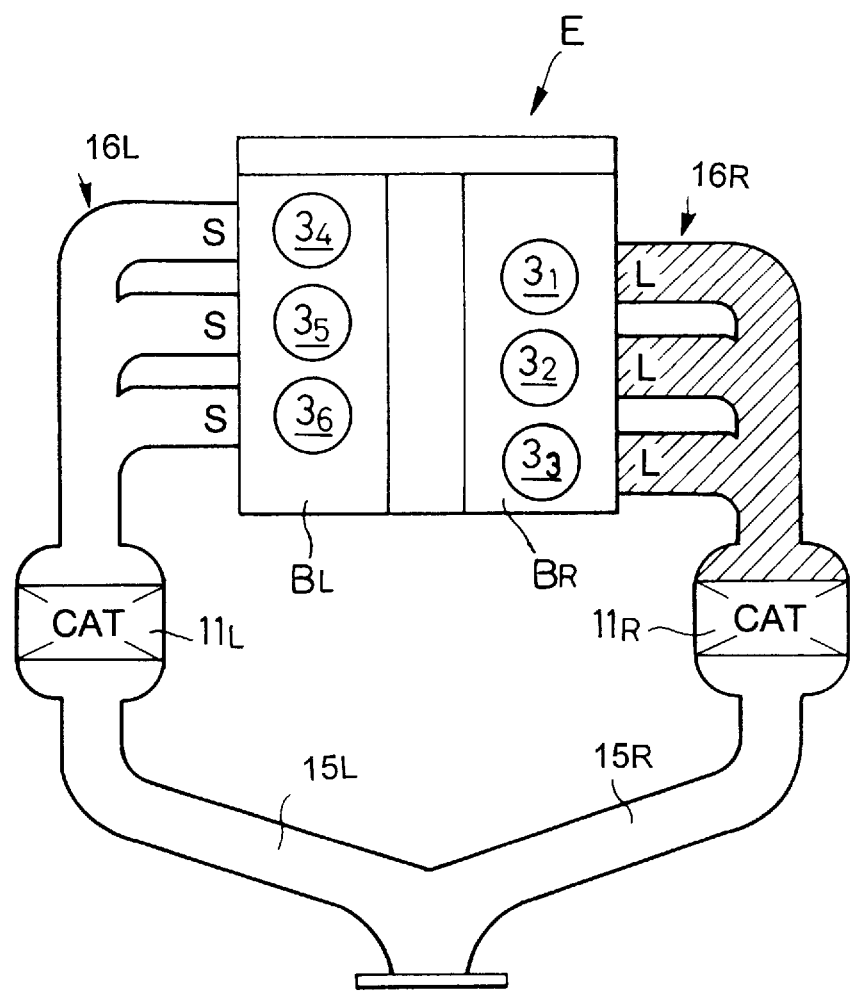

As shown in FIG. 25, an engine E in the eighth embodiment is a 6-cylinder V-type engine, and has a right bank $B_R$ including #1, #2 and #3 cylinders $3_1$, $3_2$, and $3_3$, and a left bank $B_L$ including #4, #5 and #6 cylinders $3_4$, $3_5$ and $3_6$. A right exhaust emission control catalyst $11_R$ is provided in a right exhaust passage $15_R$ connected through a right exhaust manifold $16_R$ to the right bank $B_R$, and a left exhaust emission control catalyst $11_L$ is provided in a left exhaust passage $15_L$ connected through a left exhaust manifold $16_L$ to the left bank $B_L$. The order of discharge of the exhaust gas in this 6-cylinder engine (i.e., the order of ignition) is set at an order of #1 cylinder $3_1$→#4 cylinder $3_4$→#2 cylinder $3_2$→#5 cylinder $3_5$→#3 cylinder $3_3$→#6 cylinder $3_6$.

Figure 26:
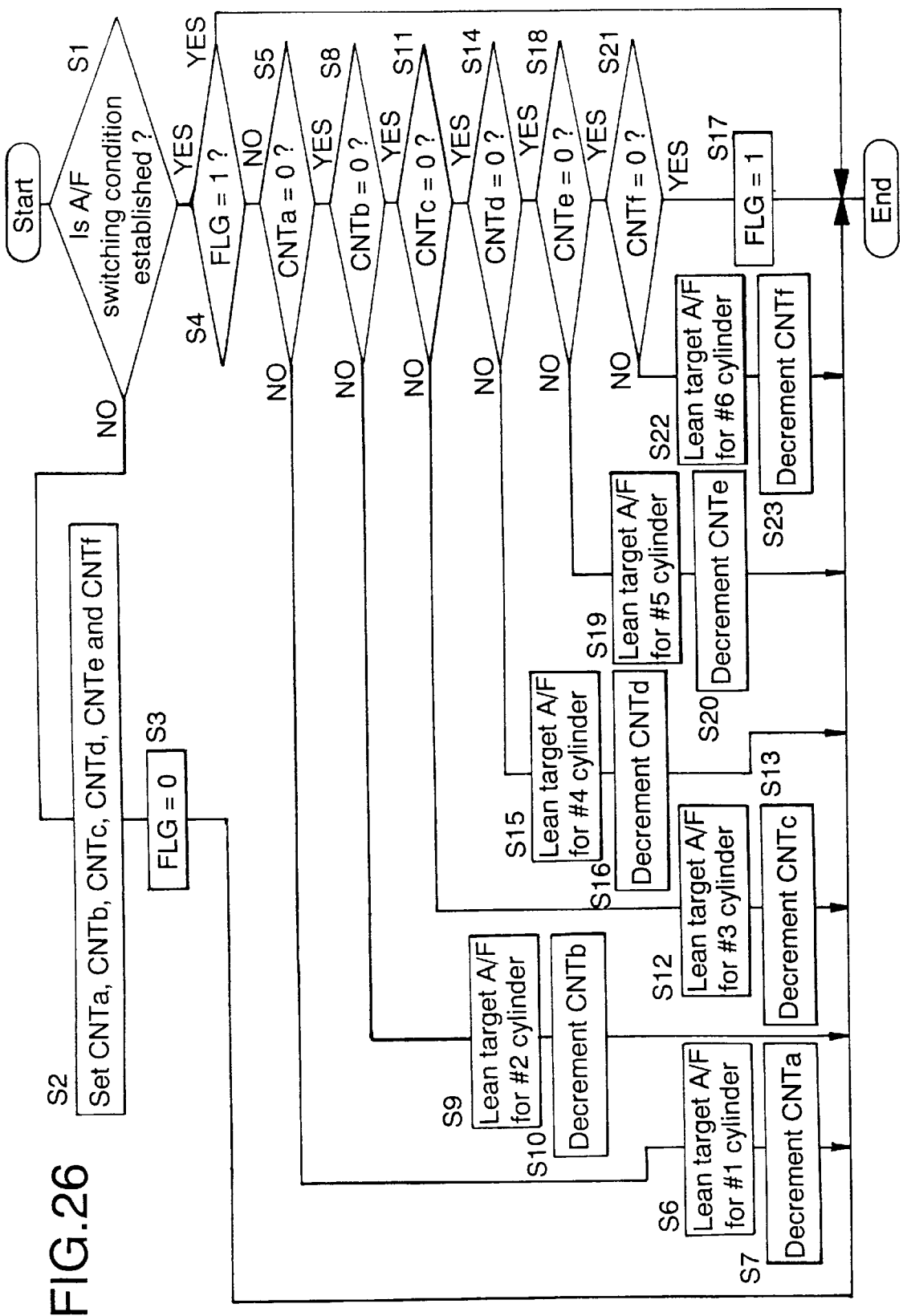
Figure 27:
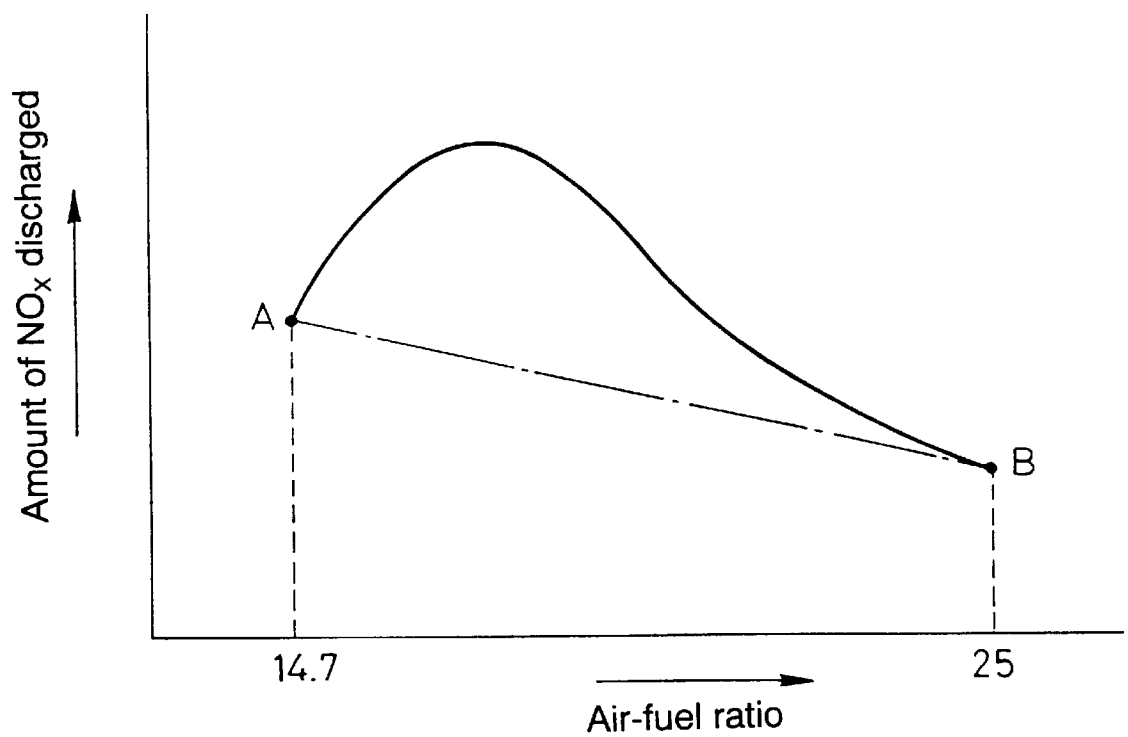
FIG. 27 is a graph illustrating the relationship between the air-fuel ratio and the amount of $NO_x$ discharged.

FIG. 26 is a flow chart similar to FIG. 20 (the flow chart in the seventh embodiment), wherein steps S1 to S17 in FIG. 26 substantially correspond to those in FIG. 20, and newly added steps S18 to S23 correspond to the fifth #5 cylinder and the sixth #6 cylinder. The #1 to #6 cylinders in the flow chart correspond to cylinders $3_1$ to $3_6$ in FIG. 25.

Therefore, when the target air-fuel ratio has been established, the air-fuel ratios for the three cylinders $3_1$, $3_2$ and $3_3$ in the right bank $B_R$ are first sequentially switched from the stoichiometry to the lean and then, the air-fuel ratios for the three cylinders $3_4$, $3_5$ and $3_6$ in the left bank $B_L$ are sequentially switched from the stoichiometry to the lean. While the air-fuel ratios for the three cylinders $3_1$, $3_2$ and $3_3$ in the right bank $B_R$ are being switched from the stoichiometry to the lean, all of the air-fuel ratios for the three cylinders $3_4$, $3_5$ and $3_6$ in the left bank $B_L$ are maintained at the stoichiometry and hence, the purifying performance of the left exhaust emission control catalyst $11_L$ can be maintained at a high level to suppress the amount of $NO_x$ discharged to a minimum level as a whole.

In switching the target air-fuel ratio from the lean to the stoichiometry, the air-fuel ratios for the three cylinders $3_1$, $3_2$ and $3_3$ in the right bank BR are first sequentially switched from the lean to the stoichiometry and then, the air-fuel ratios for the three cylinders $3_4$, $3_5$ and $3_6$ in the left bank $B_L$ are sequentially switched from the lean to the stoichiometry. Therefore, while the air-fuel ratios for the three cylinders $3_4$, $3_5$ and $3_6$ in the left bank $B_L$ are being switched after all the air-fuel ratios for the three cylinders $3_1$, $3_2$ and $3_3$ in the right bank $B_R$ have reached the stoichiometry, the purifying performance of the right exhaust emission control catalyst $11_R$ is maintained at a high level to prevent an increase in amount of $NO_x$ discharged.

Although the embodiments of the present invention have been described in detail, it will be understood that the present invention is not limited to the above-described embodiments, and various modifications in design may be made without departing from the spirit and scope of the invention.

For example, in the first, second, third and fourth embodiments, the electronic air control valve 7 (eacv 7) is used as the intake air amount control means M3, but in place of this electronic air control valve 7, a throttle valve connected to a motor and electrically controlled for opening and closing can be used.

What is claimed is:

1. An air-fuel control system in an internal combustion engine, comprising a fuel injection valve provided at each of plural cylinders, an EGR gas circulation amount control means for controlling an amount of EGR gas circulated from an exhaust passage to an intake passage, a target air-fuel ratio setting means for setting a target air-fuel ratio based on an operational state of the internal combustion engine, and a fuel injection amount control means for controlling an amount of fuel injected by each said fuel injection valve based on the target air-fuel ratio, in which when said target air-fuel ratio setting means has switched the target air-fuel ratio, said fuel injection amount control means sequentially decreases said amounts of fuel injected with predetermined intervals for each said fuel injection valve, said air-fuel control system further including a residual EGR gas amount calculating means for calculating an amount of EGR gas remaining in the intake system, whereby when said target air-fuel ratio setting means has switched the target air-fuel ratio, said EGR gas circulation amount control means decreases an amount of EGR gas circulated, and said fuel injection amount control means starts said decreasing of the amount of fuel injected after said decreasing of said residual EGR gas amount calculated by said residual EGR gas amount calculating means is reduced to at least a predetermined value.

2. An air-fuel control system in an internal combustion engine according to claim 1, wherein when the target air-fuel ratio is in a lean limit range, said EGR gas circulation amount control means stops the circulation of an EGR gas, and said fuel injection amount control means starts decreasing the amount of fuel injected after said decreasing of the residual EGR gas amount calculated by said residual EGR gas amount calculating means is reduced to zero.

3. An air-fuel control system in an internal combustion engine, comprising a fuel injection valve provided at each of plural cylinders, an EGR gas circulation amount control means for controlling an amount of EGR gas circulated from an exhaust passage to an intake passage, a target air-fuel ratio setting means for setting a target air-fuel ratio based on an operational state of the internal combustion engine, and a fuel injection amount control means for controlling an amount of fuel injected by each said fuel injection valve based on the target air-fuel ratio, in which when said target air-fuel ratio setting means has switched the target air-fuel ratio, said fuel injection amount control means sequentially decreases the amounts of fuel injected with predetermined intervals for each said fuel injection valve, said air-fuel ratio control system further including a residual EGR gas amount calculating means for calculating an amount of EGR gas remaining in the intake system, whereby when said target air-fuel ratio setting means has switched the target air-fuel ratio, the decreasing of an amount of EGR gas circulated by said EGR gas circulation amount control means and the decreasing of the amount of fuel injected by said fuel injection amount control means are started, and the amount of fuel injected is decreased by said fuel injection amount control means in accordance with the decreasing of the residual EGR gas amount calculated by said residual EGR gas amount calculating means.

4. An air-fuel control system in an internal combustion engine according to claim 3, wherein when the target air-fuel ratio is in a lean limit range, said EGR gas circulation amount control means stops the circulation of the EGR gas.

* * * * *